US007111782B2

(12) United States Patent
Homewood et al.

(10) Patent No.: US 7,111,782 B2
(45) Date of Patent: Sep. 26, 2006

(54) SYSTEMS AND METHODS FOR PROVIDING SECURITY IN A VOTING MACHINE

(76) Inventors: John Paul Homewood, 2533 Venado Camino, Walnut Creek, CA (US) 94598; Thomas E. Keeling, 6368 Mountford Dr., San Jose, CA (US) 95123; Paul David Terwilliger, 22 Summit Dr., Grantham, NH (US) 03753-1460; Marc R. Latour, 1217 Center Ave., Martinez, CA (US) 94553

( * ) Notice: Subject to any disclaimer, the term of this patent is extended or adjusted under 35 U.S.C. 154(b) by 0 days.

(21) Appl. No.: 10/811,969

(22) Filed: Mar. 30, 2004

(65) Prior Publication Data

US 2004/0238632 A1 Dec. 2, 2004

Related U.S. Application Data

(60) Provisional application No. 60/458,961, filed on Apr. 1, 2003.

(51) Int. Cl.
*G06K 17/00* (2006.01)
*G07C 13/00* (2006.01)

(52) U.S. Cl. ........................................ 235/386; 705/12

(58) Field of Classification Search ................ 235/386; 70/58; 345/700, 772; 299/1.9; 358/51, 358/1.14; 347/175; 705/12
See application file for complete search history.

(56) References Cited

U.S. PATENT DOCUMENTS

| | | | | |
|---|---|---|---|---|
| 4,641,240 | A | 2/1987 | Boram | |
| 4,649,264 | A | 3/1987 | Carson | |
| 4,880,202 | A * | 11/1989 | Gauss | 248/676 |
| 5,299,436 | A * | 4/1994 | Spitzer | 70/58 |
| 5,585,612 | A | 12/1996 | Harp, Jr. | |
| 5,752,697 | A * | 5/1998 | Mandel et al. | 271/288 |
| 5,871,615 | A * | 2/1999 | Harris | 162/140 |
| 5,933,583 | A * | 8/1999 | Van Kuringen | 358/1.15 |
| 6,081,793 | A | 6/2000 | Challener et al. | |
| 6,232,993 | B1 * | 5/2001 | Kobayashi et al. | 347/175 |
| 6,250,548 | B1 | 6/2001 | McClure et al. | |
| 6,581,824 | B1 | 6/2003 | McClure et al. | |
| 6,641,033 | B1 | 11/2003 | McClure et al. | |
| 6,769,613 | B1 | 8/2004 | McDermott et al. | |
| 2001/0001859 | A1 * | 5/2001 | Hawkins et al. | |
| 2002/0066780 | A1 | 6/2002 | Balolia | |
| 2002/0072961 | A1 | 6/2002 | McDermott et al. | |
| 2002/0077886 | A1 | 6/2002 | Chung | |
| 2002/0084325 | A1 | 7/2002 | Reardon | |
| 2002/0171681 | A1 * | 11/2002 | Nomura et al. | 345/772 |
| 2003/0006282 | A1 | 1/2003 | Vadura et al. | |

(Continued)

OTHER PUBLICATIONS

O'Connell, Ann, State of Nevada Senate, Letter to Ms. Kathryn Ferguson st Clark County Board o Country Commissioners, Jun. 6, 1995.

(Continued)

*Primary Examiner*—Thien M. Le
*Assistant Examiner*—Allyson N Trail

(57) ABSTRACT

The invention provides systems and methods for ensuring security for a voting machine. The voting machine can include a display screen upon which numerous election choices are displayed for selection by a voter. A detachable printer can also be provided that is adapted to be securely attached to the voting machine and that prints the choices selected among the election choices to a print medium to generate a printed audit trail. A summary of the election choices visible on the display screen can be simultaneously compared with the printed audit trail by the voter poised in a voting position.

195 Claims, 14 Drawing Sheets

U.S. PATENT DOCUMENTS

| | | | | |
|---|---|---|---|---|
| 2003/0030657 | A1* | 2/2003 | Kenji | 345/700 |
| 2003/0047596 | A1* | 3/2003 | Brown | 235/51 |
| 2003/0062411 | A1 | 4/2003 | Chung et al. | |
| 2003/0195798 | A1 | 10/2003 | Goci | |
| 2004/0051368 | A1* | 3/2004 | Caputo et al. | 299/1.9 |
| 2004/0080777 | A1* | 4/2004 | Smith | 358/1.14 |
| 2004/0195323 | A1* | 10/2004 | Vadura et al. | 235/386 |
| 2005/0062410 | A1* | 3/2005 | Bell et al. | 313/506 |

OTHER PUBLICATIONS

Mercuri, Rebecca, "Electronic Vote Tabulation Checks & Balances," Ph.D. Dissertation Defense, Thesis Abstract, University of Pennsylvania School Engineering and Applied Science, Department of Computer and Information Systems, Friday, Oct. 27, 2000, 2:30 pm http://www.nostablesoftware.com/Papers/thesdefabs.html.

Mercuri, Rebecca, "Electronic Vote Tabulation Checks & Balances," A Dissertation in Computer and Information Science, Presented to the Faculties ofthe University of Pennsylvania in Partial Fulfillment of the Requirements for the Degree of Doctor of Philosophy, 2001.

Dugger, Ronnie, "Annals of Democracy Counting Votes," The New Yorker, Nov. 7, 1988 http://www.csl.sri.com/users/Neumann/dugger.html.

Saltman, Roy G., "Accuracy, Integrity, and Security in Computerized VoteTallying," Computer Science and Technology, NBS Special Publication 500-158, Institute for Computer Sciences and Technology, National Bureau of Standards, Aug. 1988 http://www.itl.nist.gov/lab/specpubs/500-158.html.

Mercuri, Rebecca, "Voting-Machine Risks," Inside Risks 29, CACM 35, Nov. 11, 1992 http://notablesoftware.com/Papers/vmrisks.html.

Shamos Ph.D., J.D., Michael Ian, "CFP'93—Electronic Voting—Evaluating the Threat," CPSR, 1993 http://www.cpsr.org/conferences/cfp93/shamos.html, Mar. 1993.

Neumann, Peter G., "Security Criteria for Electronic Voting," Computer Science Laboratory, SRI International, Presented at the 16th National Computer Security Conference, Sep. 20-23, 1993 http://www.csl.sri.com/users/Neumann/ncs93.html.

Mercuri, Rebecca, "Corrupted Polling," Inside Risks 93 CACM 36, Nov. 11, 1993, p. 122 http://www.notablesoftware.com/Papers/corrpoll.html.

Saltman, Roy G., "CFP'93—Assuring Accuracy, Integrity and Security in National Elections: The Role of the U.S. Congress," CPSR, National Institute of Standards and Technology, Feb. 12, 1993 http://www.cpsr.org/conferences/cfp93/saltman.html.

Mercuri, Rebecca, "The FEC Proposed Voting Systems Standard Update [A Detailed Comment]," Submitted to the Federal Election Commission on Sep. 10, 2001 in accordance with Federal Register FEC Notice 20019, vol. 66, No. 132 http://www.notablesoftware.com/Papers/FECRM.html.

"The History of Electronic Voting" http://www.eucybervote.org/Reports/KUL-WP2-D2V1-v1.0-01.html.

Mercuri, Rebecca T., "Physical Verifiability of Computer Systems," Notable Software, 1997.

"Voters Prefer To See Their Votes Recorded On Paper According to Surveys Reported by AccuPoll," BUSINESSWIRE, Feb. 3, 2003.

Mercuri, Rebecca, "A Better Ballot Box?," IEEE Spectrum, Oct. 2002, pp. 46-50.

"Resolution on electronic voting" Last modified Jan. 20, 2000 http://verify.Stanford.edu/dill/EVOTE/statement.html.

Dugger, Ronnie, "Annals of Democracy Counting Votes," The New Yorker, Nov. 7, 1988 http://www.newsgarden.org/columns/dugger.shtml.

"VOTING—What Is, What Could Be," CALTECH MIT, Voting Technology Project, Jul. 2001.

Newspaper Articles—Las Vegas Review Journal—Jul. 1994.

Rebecca Mercuri—Explanation of Voter-Verified Ballot Systems—Jul. 2002.

May 1995 Minutes of Senate Committee.

May 1995—Minutes of Assemibly Committee on Elections and Proc.

Feb. 1995—Minutes of Senate Committee on Govt. Affairs.

'86—Hyde—Progress Report on Computerized Voting

'86—Benson—Computerized Voting.

* cited by examiner

SYSTEMS AND METHODS FOR PROVIDING SECURITY IN A VOTING MACHINE

CROSS-REFERENCE TO RELATED APPLICATION

This application claims the benefit of U.S. Provisional Application No. 60/458,961, filed on Apr. 1, 2003, the disclosure of which is incorporated by reference herein.

BACKGROUND OF THE INVENTION

1. Field of Invention

This application relates to a voting system having an image recording device attached to one side of a voting machine that maintains secure voting election data information.

2. Description of Related Art

Conventionally, voting systems including a printing device are described as including a standard printer. The printer may be located either in the vicinity of the voting machine, locked within the voting machine, or integrated with the voting machine. However, various disadvantages are associated with such conventional voting systems. For example, in many countries a printed audit trail, such as a paper copy of the cast ballots, is required by law. Such a printed audit trail can be necessary in the case where a manual re-count of the votes is called for at a future date. The term printed audit trail describes a printed paper receipt summary of the candidates for whom a voter has voted, and thus can provide a hard copy of an election. For example, in the United States, when votes are being re-counted the paper ballots are taken out of storage and viewed by two poll workers, each of whom record the vote before the new results are tallied. As a result, it is important that the paper ballot or printed audit trail is an accurate representation of each vote cast, and that the ballot has not been altered or tampered with.

Visibility is another disadvantage suffered by conventional voting systems. For example, conventional voting systems do not allow a voter to see the printed audit trail, and consequently the voter may not be given a high level of confidence that the voting system accurately recorded their vote. Further, in some conventional voting systems having printers, the voter can see the printed audit trail, but only after the voter has cast their vote. In this case, a voter must remember the candidates that they had previously voted for, which may be difficult in situations where there are a large number of candidates to choose from, a number of positions to elect candidates for, or voters participating in several elections at once.

Another significant disadvantage of the conventional voting systems is security. For example, in conventional voting systems, a voter can access the printed audit trail, and therefore could also alter or tamper with the printed audit trail. For example, in U.S. Patent Application Publication 2003/0006282 there is disclosed Systems and Methods for Electronic Voting showing a basic structure for a plurality of voting modules connected to each other through a network. However, as is evident, the invention fails to provide any device that provides security to the various parts of its system to ensure that the printed audit trail is not tampered with. All of the subject matter of the above application is incorporated herein by reference in its entirety.

SUMMARY OF THE INVENTION

Various exemplary embodiments of the systems and methods of this invention recognize a need for casting a vote and verification of its accuracy before the votes cast are archived. The present invention can provide a voting machine in which the printed audit trail can be compared with a summary on the display. Thus, voter confidence in casting a vote and verification of its accuracy, as well as improved security, compactness, reliability and ease of use can be improved.

The systems and methods according to the invention provide for an optional, easily detachable, recording medium that maintains untampered accuracy and security of the voting election data information. In particular, the recording medium can be integrated into the voting system such that the voter can compare a summary of their selectable election choices visible on a visual display of a selection panel of the voting system, to the printed audit trail of that same summary while voting without the voter having to change their viewing angle.

A method according to the invention provides for a voter to compare a printed audit trail summary of their selected votes to a visual display of the summary to ensure that the printed audit trail summary corresponds to the visual display of the summary, before accepting the selected votes and casting their vote.

The systems and methods according to the invention can also provide for enhanced visibility in that the invention allows a voter to view the printed audit trail in a normal voting position, thus making it easier to see and compare the printed audit trail with the summary displayed on the selection panel, while maintaining the privacy of the voter while in the normal voting position.

The systems and methods according to this invention can also provide for improved voter confidence. Specifically, because the visibility of the printed audit trail is improved and the ease with which the printed audit trail can be compared to the visual display improves, a voter is more confident that their vote has been properly recorded. Specifically, the invention shows a voter that: a) the printed receipt or printed audit trail and the visual summary on the display of the selection panel are identical; b) the voter pressed the correct selection buttons to designate the intended candidates that the voter intended to vote for; c) the voting system has recorded these votes correctly, both on paper and electronically; and d) the summary is accurate and legible, and will be read correctly should a re-count of the votes be required in the future.

The systems and methods according to the invention can also provide for improved security and tampering resistance of the image recording device. For example, the image recording device is specifically designed to be attached and detached, or to be integrated into the voting system. Attachment and detachment of a distinct image recording device in a specific manner is more secure than attaching a standard printer (i.e., one that can be bought commercially, for example an Epson, HP etc.) to a voting system, as described in the prior art. This is because a standard printer could easily be switched with another standard printer. However, according to the present invention, any such attempt to switch the image recording medium would be visually obvious since the image recording medium of the present invention looks distinctly different from a standard printer. Further, the image recording medium according to the present invention is designed to be attached or integrated into the voting system, whereas a standard printer is not designed to be attached or integrated into the voting system in accordance with this invention and would also not be compatible with the voting system for the intended purposes of the present invention. Manufacture, supply and transport of the image recording device could also be controlled, whereas these factors could not be controlled in the case of a standard printer. In addition, a standard printer allows easy access to its blank and printed paper, whereas the image recording device in the present invention ensures that its recording medium cannot be accessed without specific authorization.

The systems and methods according to the invention enable the image recording device to have a host of security features to prevent voters and/or other persons from removing and/or tampering with the recording medium, or the image recording device.

The systems and methods according to invention can also provide for ease of transport. For example, the image recording device of the present invention is smaller and more compact than a standard printer, and thus is easier to transport and store.

The systems and methods according to this invention provide for improved reliability. Specifically, the mechanism used in the image recording device is less prone to software and mechanical failure.

According to the systems and methods of this invention, the image recording device incorporates a number of fail-safe devices to ensure the image recording device is running correctly and to inform poll workers of any mechanical or technical faults that may occur.

BRIEF DESCRIPTION OF THE DRAWINGS

Various exemplary embodiments of the systems and methods of the invention are described in detail below, with reference to the attached drawing figures, in which.

DETAILED DESCRIPTION OF EXEMPLARY EMBODIMENTS

In accordance with the present invention, there is disclosed an example of a voting system having an image recording device that is attached to one side of a selection panel of a voting machine. Accordingly, a voter can compare information presented on a display screen of the selection panel to a receipt or printed audit trail printed onto a recording medium of the image recording device while voting and without the voter having to change their position or viewing angle. As described above, the printed audit trail is a hard copy of the election results that can be used by poll workers, subsequent to the election, to monitor voting results, such as confirming results by re-counting the votes.

Figure 1:
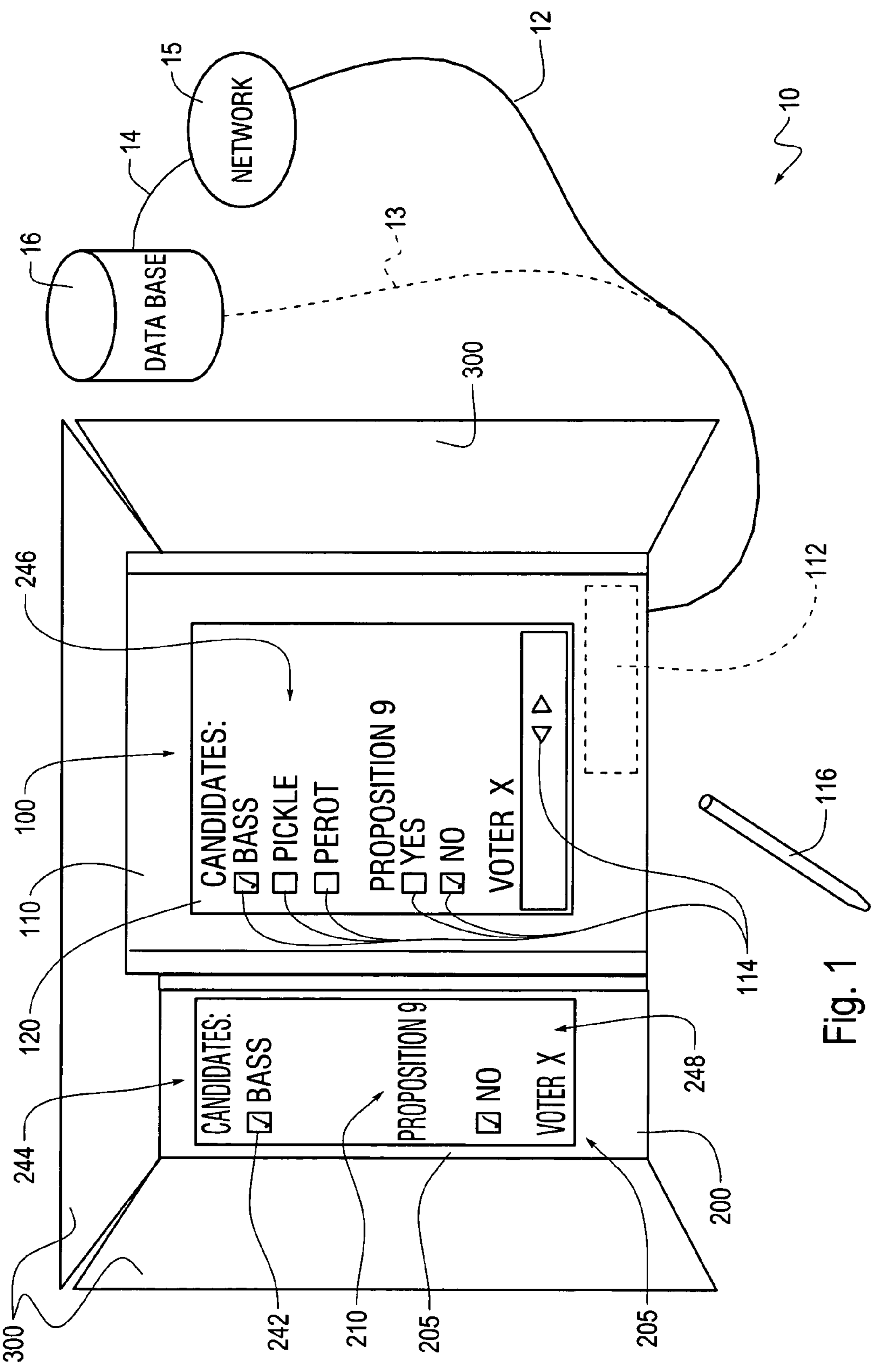
FIG. 1 illustrates an exemplary illustration of a voting system according to this invention.

FIG. 1 illustrates an exemplary voting system 10 according to system and methods of the invention. As shown in FIG. 1, the voting system 10 can include a voting machine 100 having a selection panel 110 with a display screen 120, an image recording device 200 for generating print data 242 on a recording medium 210. The image recording device 200 can be a printer box 205 that is attached to the voting machine 100. The image recording device 200 can be used to create a printed audit trail 244 that shows a voter's selections 248. The voting system 10 can include numerous privacy shields 300 to ensure privacy to a voter casting their vote.

According to this exemplary embodiment, the voting machine 100 shown in FIG. 1 can include a controller or processing apparatus 112. The processing apparatus 112 can be, for example, implemented as a programmed general purpose computer. However, the processing apparatus 112 can also be implemented as a special purpose computer, a programmed microprocessor or a microcontroller and peripheral integrated circuit elements, an ASIC or other integrated circuit, a digital signal processor, a hardwired electronic or logic circuit, such as a discrete element circuit, a programmable logic device such as a PLD, PLA, FPGA or PAL, or the like. In general, any device capable of implementing a finite state machine that in turn is capable of implementing the flowcharts shown in FIGS. 11 and 14, can be used in accordance with the systems and methods of this invention.

As shown in FIG. 1, the voting machine can further include a processing apparatus 112 having a link 12. As shown, the link 12 can couple the processing apparatus 112 to a network 15, database 16, or both. The link 12 can be any known or later developed device or system allowing the processing apparatus 112 of the voting system 10 to communicate with the database 16 that stores electronic data information for use with the voting system 10, such as software to update and/or download the electronic data information for the voting system 10. Also, it should be appreciated that the link 12 of the voting system 10 connecting a memory of the processing apparatus 112 can be a wired or wireless link to a network 15. For example, the link 12 can be a direct connection 13, an indirect connection 14 over the network 15, for example, a wide area network or a local area network, a connection over an intranet, a connection over the Internet, or a connection over any other distributed processing network or system.

Alternatively, a memory can be included in the detachable printer or the voting machine 100 where electronic data information can be stored on and recalled from electronic storage devices, such as a CD/DVD, or any type of known or later developed device that stores electronic data information. The electronic storage devices can be coupled to the processor 112 as needed.

The display screen 120 of the selection panel 110 can include a plurality of selection buttons 114 that control various operations of the voting system 10. The selection buttons 114 may be selected manually by a voter, for example, by touching a touchscreen or the display screen 120 with a finger. Alternatively, an input device 116 can be used to select from among the various selection buttons 114. In various exemplary embodiments, the input device 116 may include, for example, a mouse, a keyboard, trackball, and any other known or later developed type of input device, such as a stylus, a keypad and a touchscreen. Additionally, the display screen 120 can have a ballot contained within a protective plastic cover that is securely held above buttons or switches on the display screen. The buttons can correspond to the ballots so that when a voter selects a choice on the ballot, the corresponding underlying button is depressed, and thus the voter selection is recorded by the voting machine. As will be discussed in greater detail below, the display screen 120 can be constructed of one or more LCD cells so that the print data 242 or a portion thereof can be selectively displayed by turning on or off the LCD.

The privacy shields 300 of the voting system 10 can be used to provide voter secrecy and privacy. The privacy shields 300 can be attached at various locations, for example, to one side of the printer box 205, and/or on either side of the selection panel 110 of the voting machine 100. The privacy shields 300 can be attached anywhere in the voting system 10 so long as the privacy shields 300 provide adequate privacy to the voter while casting their vote. The privacy shields 300 can be made of any material that is sufficient to provide privacy, for example, the privacy shields 300 can be composed of wood, plastic, metal, cloth material, and the like. It should be understood that the privacy shields 300 can be constructed in any arrangement that can provide sufficient privacy to the voter.

Figure 2:
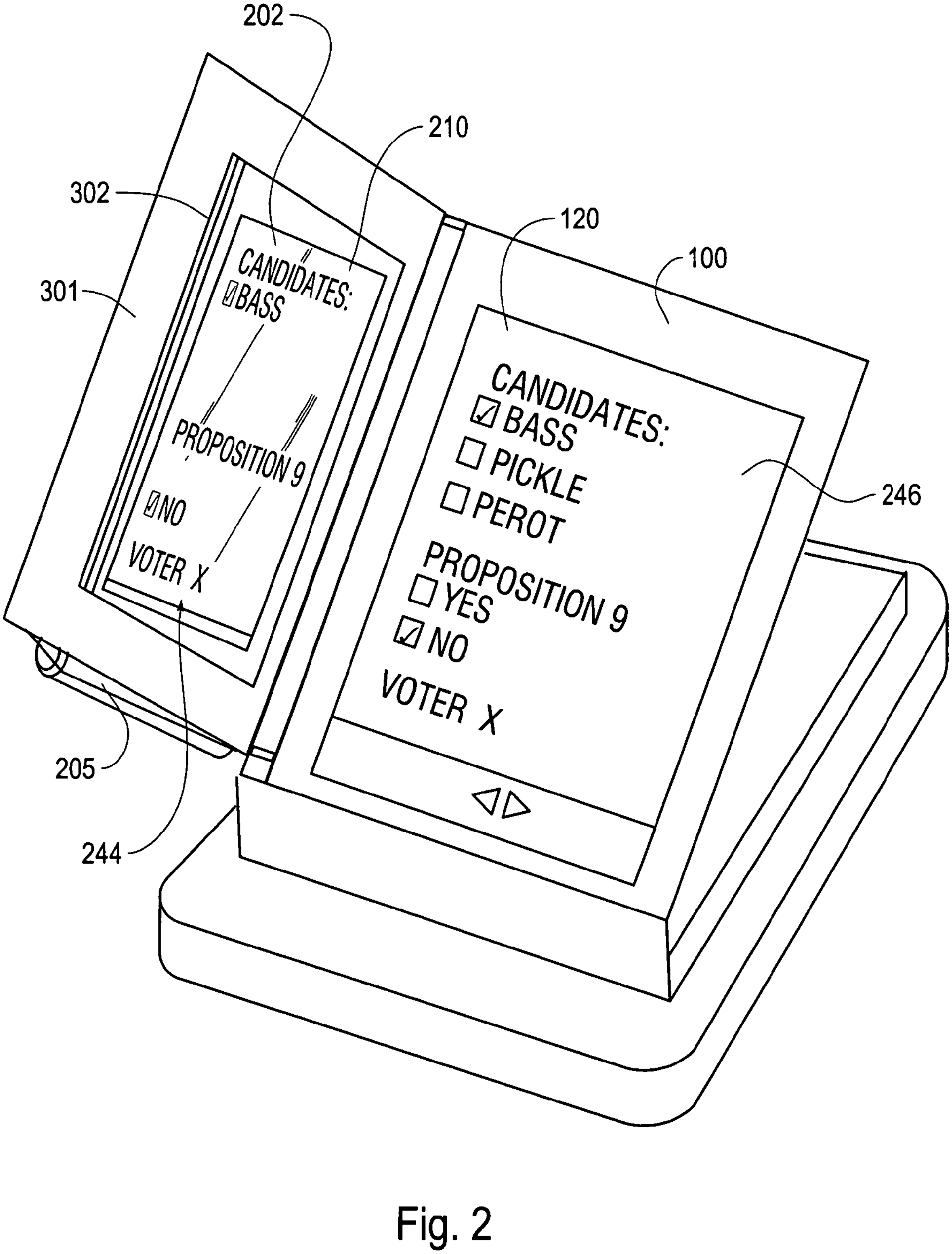
FIG. 2. illustrates a perforated privacy shield attached to a voting machine in accordance with an alternative aspect according to this invention.

FIG. 2. shows attaching a perforated privacy shield 301 in accordance with another aspect the invention. The perforated privacy shield 301 is shown attached to one side of the selection panel 110 of the voting machine 100. The printer box 205 is also attached to the same side of the selection panel 110. In this case, a hole 302 can be made in the perforated privacy shield 301 to allow viewing of a printed receipt (or printed audit trail) 244.

Figure 3:
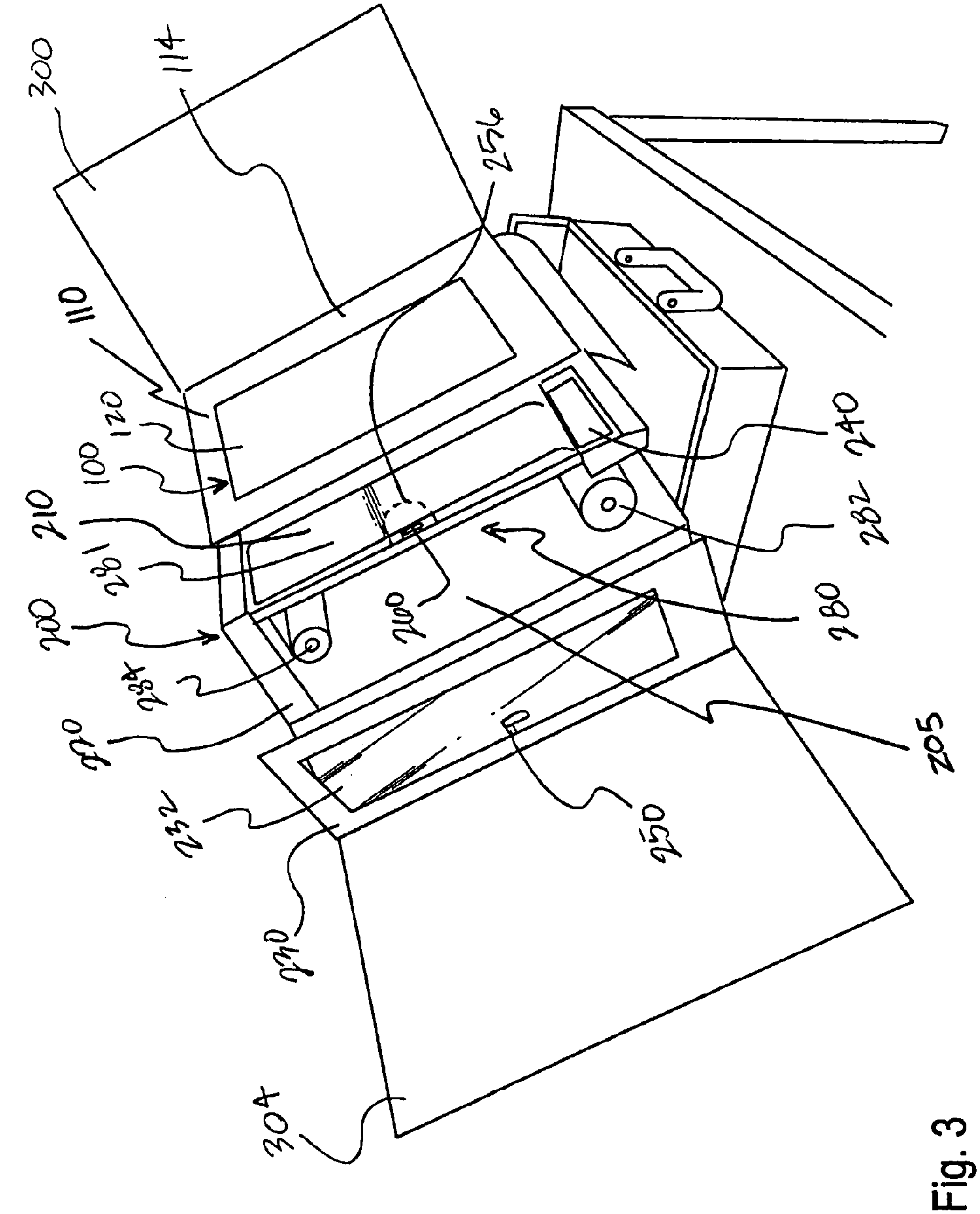
FIG. 3 shows a reel-to-reel printer disposed within an open printer box of the voting system according to this invention.

FIG. 3 illustrates an alternative design in which a combined printer box/privacy shield 304 is attached to one side of the selection panel 110 of the voting machine 100. As shown, the combined printer box/privacy shield 304 is combined with the printer box 205 as a separate unit apart from the voting machine 100. In operation, the combined printer box/privacy shield 304 is attached to one side of the voting machine 100. It should be understood that various modifications and arrangements for the privacy shields 300, 301 are possible without departing from the spirit and scope of the present invention.

As also shown in FIG. 3, the printer box 205 of the image recording device 200 includes a container 220 with a cover 230 that can be removed. The printer box 205 is a self-contained unit that can be attached to the side of the voting machine 100 or can be built into the voting machine 100 as an integral component. The printer box 205 houses the recording medium 210. According to this exemplary embodiment, the recording medium 210 has a reel-to-reel configuration.

In order to communicate with the voting machine 110, the printer box 205 can be designed to include integral electrical contacts, such that when the printer box 205 is fastened to the selection panel 110 of the voting machine 100, power up and data communication is initiated between the voting machine 100 and the printer box 205 of the image recording device 200. On the contrary, when the printer box 205 is not attached to the selection panel 114, it is not possible for the voter to vote because the voting system 101 will be rendered inoperable. According to the systems and methods of the invention, the printer box 205 can also be designed with a parallel or serial data interface for cable or cable-less communication with the voting machine 100.

Figure 4:
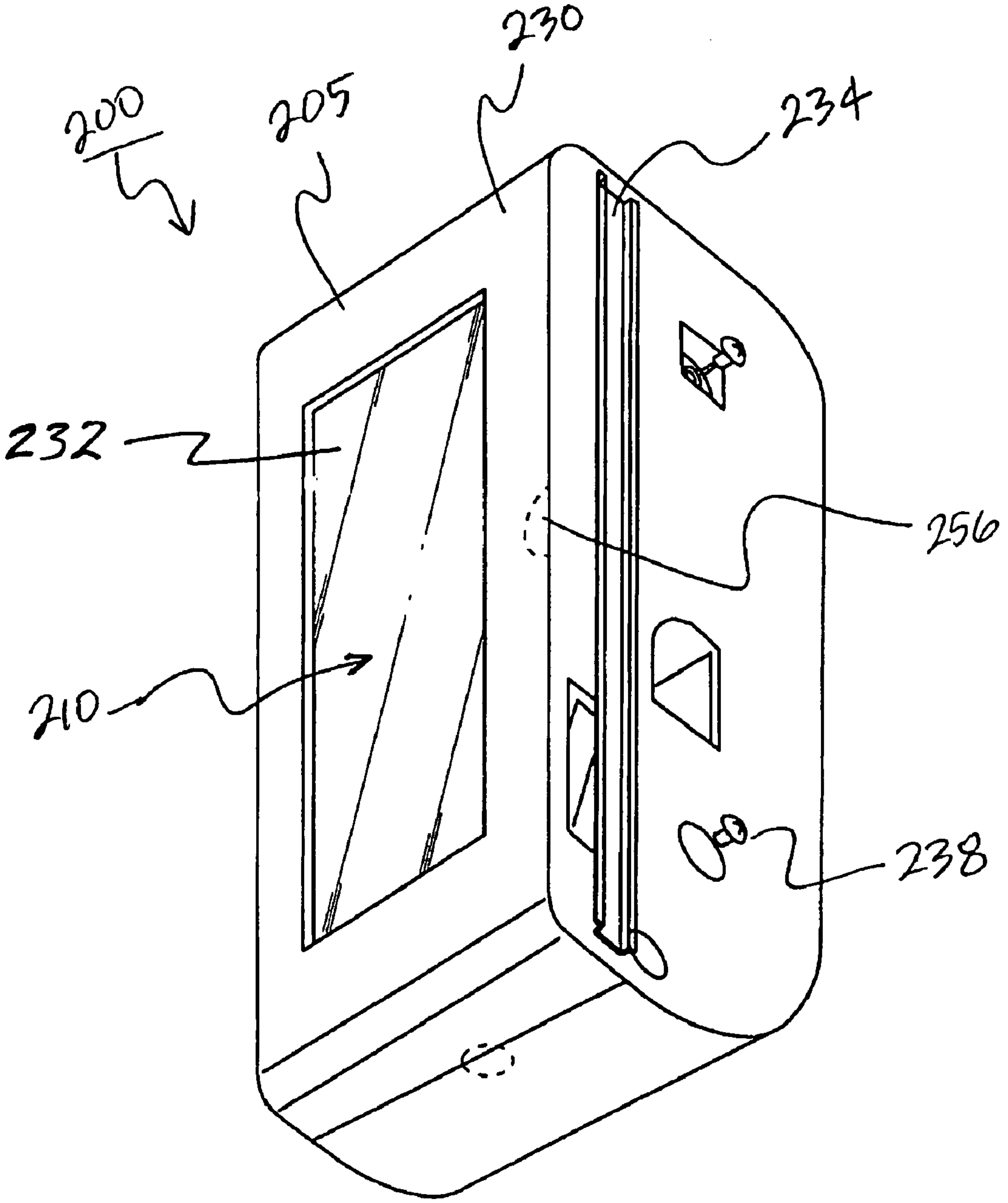
FIG. 4 shows an exemplary fastening mechanism in which a rail is attached to one side of the printer box in accordance with this invention.
Figure 5:
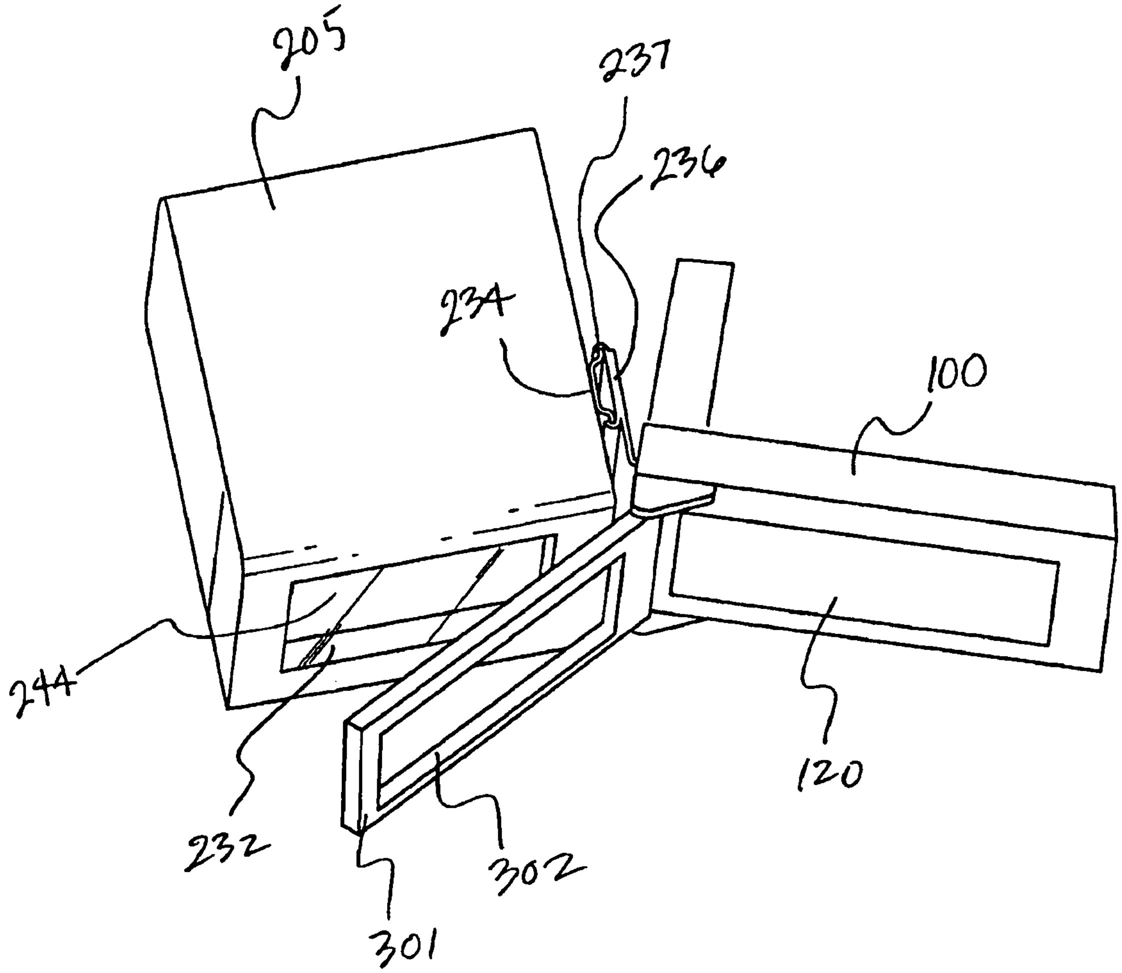
FIG. 5 shows a fastening mechanism including a holder attached to one side of the voting machine being fastened to a rail attached to the printer box according to this invention.
Figure 6:
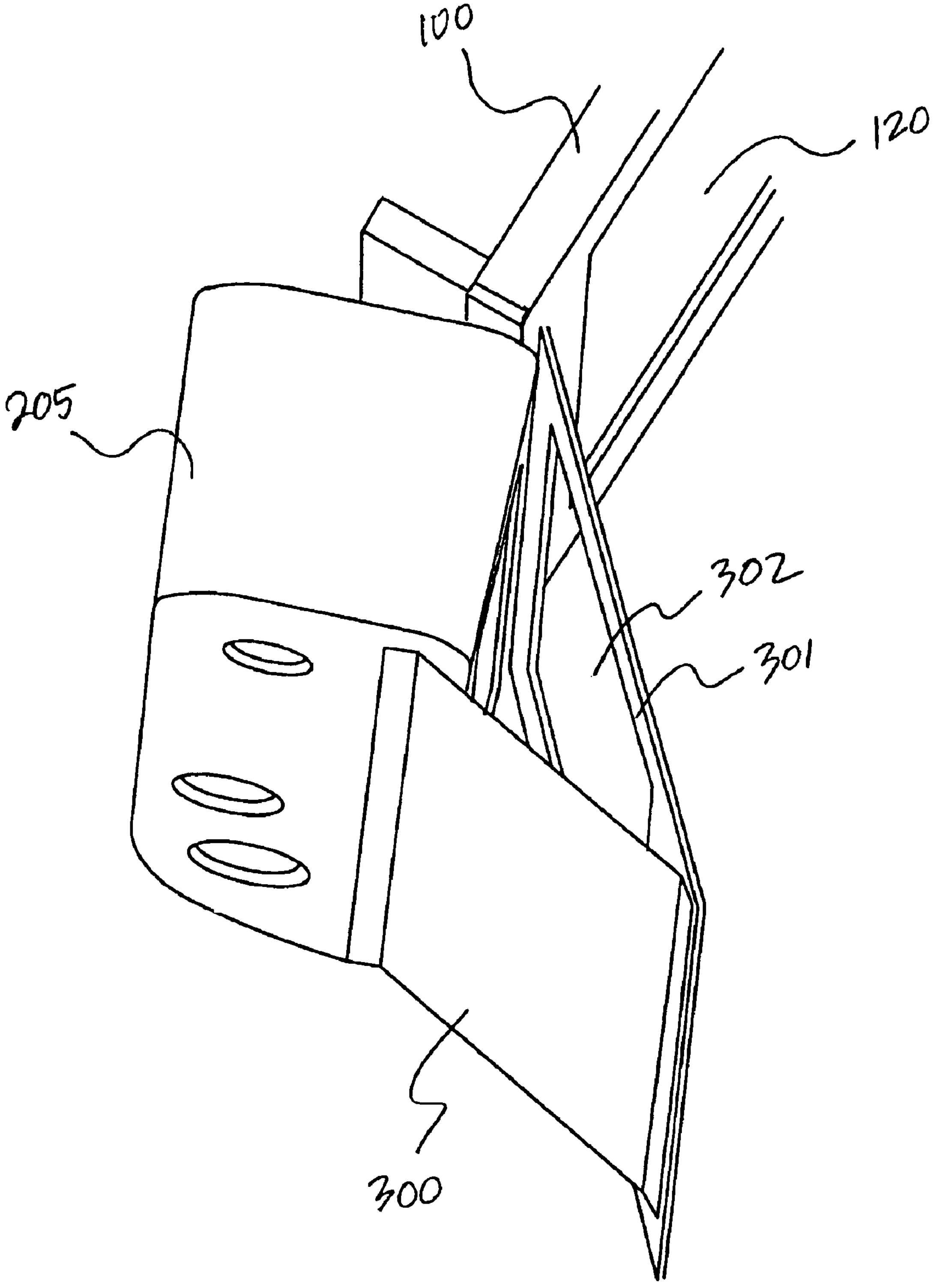
FIG. 6 shows a perspective view of the printer box secured to the voting machine in a slotting manner according to this invention.

FIGS. 4, 5 and 6 show an exemplary mode for attachment according to another aspect of the invention. According to this embodiment, a mechanism for fastening the printer box 205 to the voting machine 100 involves "slotting" which is similar to the mechanism for runners provided on sliding drawers.

For example, FIGS. 4 and 5 show a rail 234 attached to the side of the printer box 205. FIG. 5 shows a holder 236 fastened to a side of the voting machine 100 facing the rail 234 on the printer box 205. As shown, the holder 236 has a receiving portion 237 adapted to receive the rail 234. By this configuration, the printer box 205 can be securely held to the voting machine 100.

FIG. 6 shows the printer box 205 securely arranged on the voting machine 100 using the slotting manner. It should be understood that other modes for fastening the printer box 205 to the voting machine 100 are also possible. For example, the printer box 205 may be secured by screws, and/or any other type of commercially available fastener that is capable of fastening the printer box 205 to the voting machine 100 according to this invention. Additionally, the fasteners may include locking mechanisms, such as a simple padlock, for restricting the removal of the printer box 205 by unauthorized persons.

In addition, FIG. 6 shows the printer box 205 located behind a perforated privacy shield 301. Accordingly, during operation, a user can view the printed data 242 on the recording medium 210 through the hole 302 in the perforated privacy shield 301. Additionally, another privacy shield 300 can be disposed between an open area between the printer box 205 and the perforated privacy shield 301 to improve privacy to the voter while the voter casts their vote.

Figure 7:
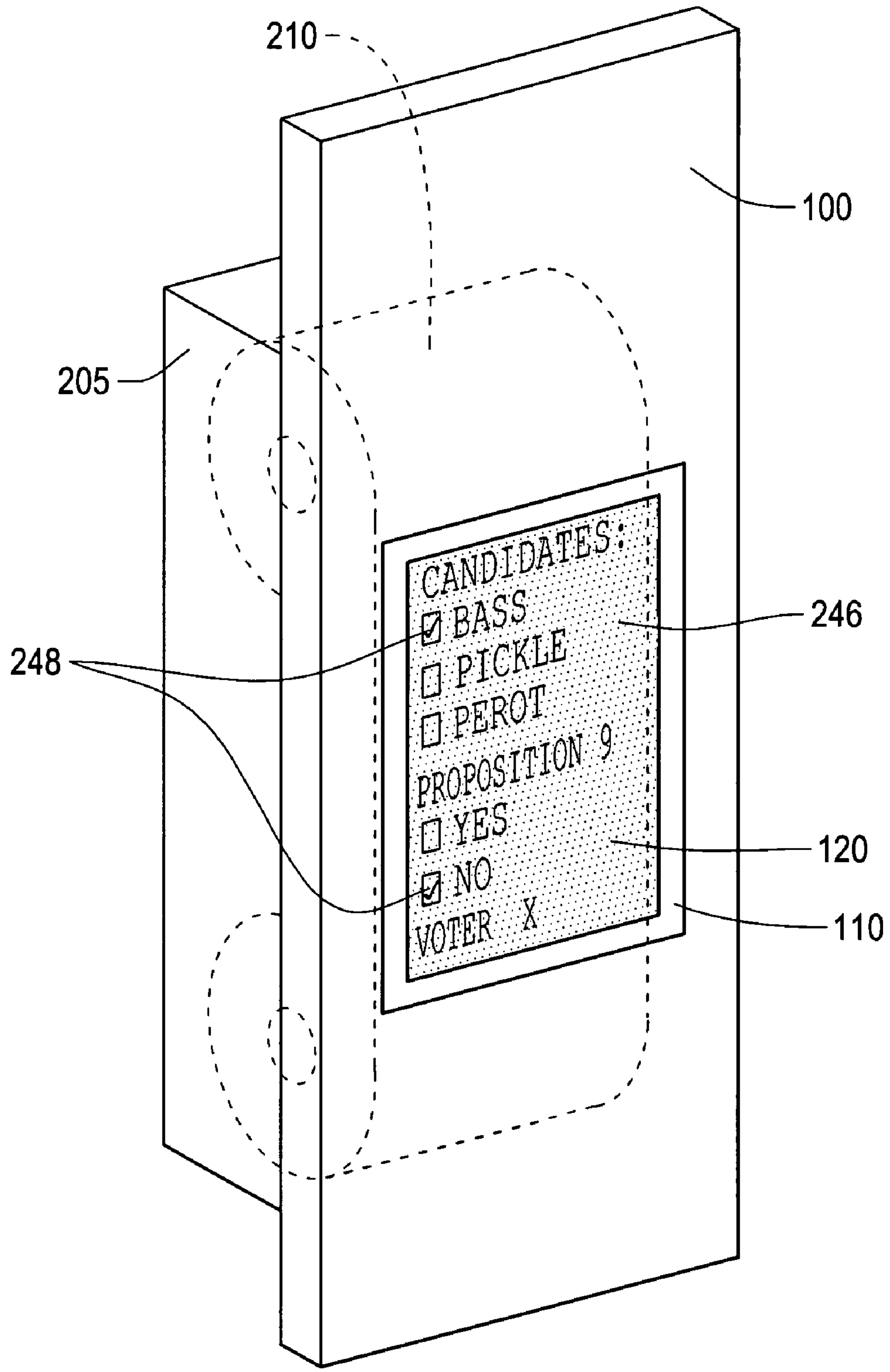
FIG. 7 shows a construction of the voting machine disposed over the printer box in an overlapping configuration according to this invention.
Figure 8:
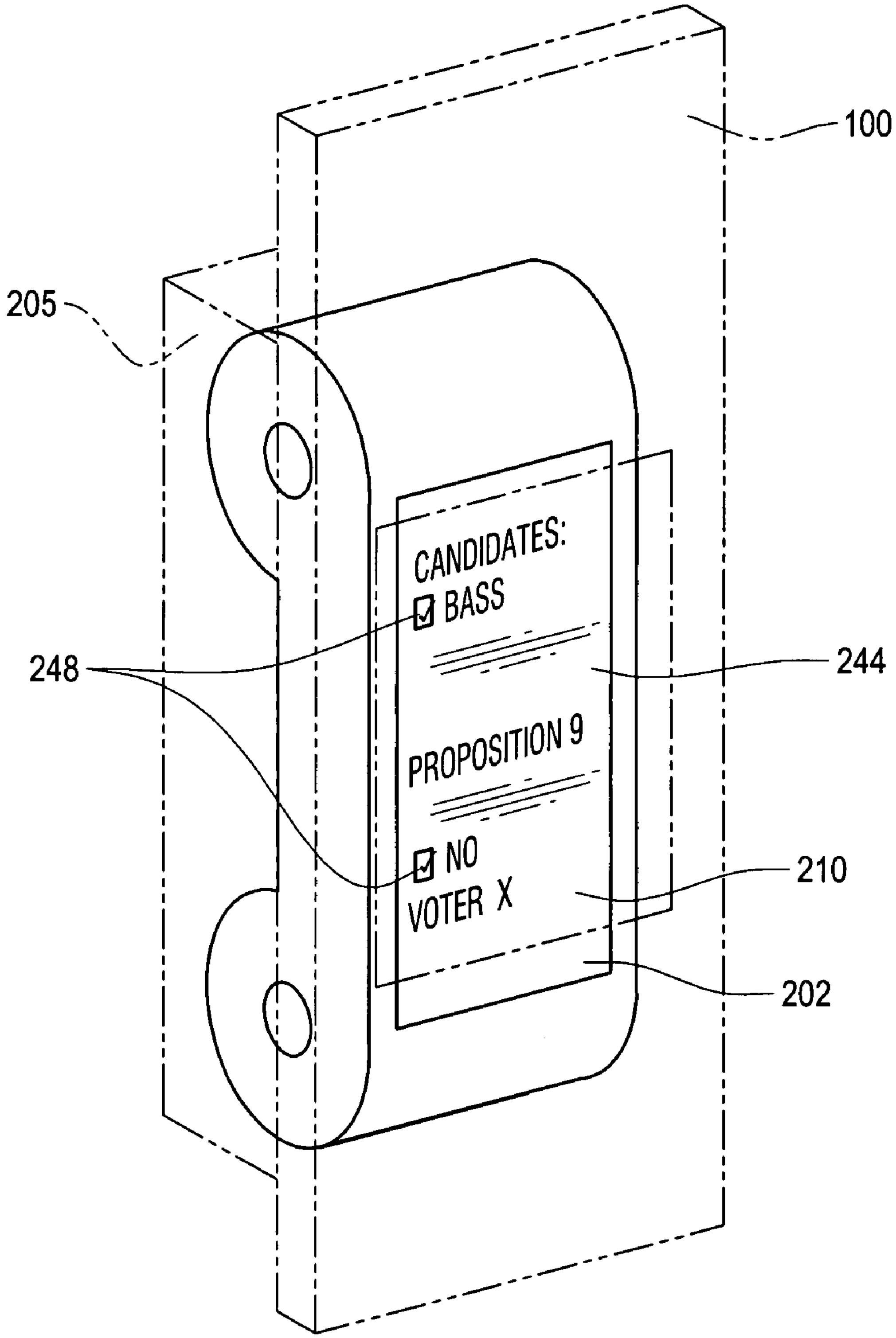
FIG. 8 shows the construction and alignment of the recording device window relative to the display screen of the voting machine in an overlapping configuration according to this invention.

FIGS. 7 and 8 show another exemplary embodiment in which the printer box 205 is integrated with the voting machine 100 in an overlapping configuration. As shown in FIG. 7, the printer box 205 can be attached behind the voting machine 100. According to this configuration, the recording medium 210 (shown in hidden lines) is positioned directly behind the display screen 120 of the voting machine 100. In operation, various selectable choices 246 are displayed on the display screen 120 of the selection panel 110 while the data printed on the recording medium cannot be seen. A voter can select choices from the selectable choices 246.

Access to the printer box 205 can be provided separate and apart from the access to the voting machine 100. This allows poll workers to remedy problems that arise within the printer box 205, such as to fix jams and/or to repair minor mechanical faults, without compromising the security of the votes casts by the voting machine 100.

FIG. 8 illustrates the recording medium 210 in solid lines to exemplify the orientation of the recording medium 210 in relation to the display screen 120 of the voting machine 100. The voting machine 100 and the printer box 205 are shown in hidden lines. At various predetermined times, the voter's selections 248 from among the selectable choices 246 (as shown in FIG. 7) can be viewed by the voter on the printed audit trail or receipt 244 of the recording medium 210.

As shown in FIG. 8, a voter can view a summary of the voter's selections 248 on the printed receipt 244 and compare them to the summary of selectable choices 246 displayed on the display screen 120 of the voting machine 100 at the same time, one on top of the other. This has the same effect as placing a traced image over an original, in that differences between the printed receipt 244 and the summary of selectable choices 246 chosen by the voter are immediately recognizable. After the voter has verified the accuracy of the voter's selections 248, the voter can then accept the selected choices and cast their vote.

To avoid interference between the summary of selectable choices 246 on the display screen 120 of the selection panel 110 and the printed receipt 244 located behind the display screen 120, the printed receipt 244 can be selectively made visible. In other words, the voter's selections 248 on the recording medium 210 can be made visible to the voter at predetermined times by making the selectable choices 240 on the display screen 120 transparent so that the voter can see marking on the recording medium 210.

According to the systems and methods of this invention, the display screen 120 can be made of a material that is capable of becoming transparent to allow the printed receipt 244 to be visible and the images on the display screen to simultaneously be transparent. The clear material provided for the display screen 120 can include, for example, amorphous silicon, a non-reflective display, a single large cell LCD or any other material capable of appearing transparent at under controlled stimulus. According to this feature of the invention, during operation the display screen 120 can be shown as opaque to hide the printed receipt of the previous voter 244 on the recording medium 210 so that only the display screen 120 of the voting machine 100 can be seen (as shown in FIG. 7). When the next voters selections have been printed and the paper advanced far enough to ensure the previous voters selections are not visible, then a the control is activated to the display screen 120, display screen 120 is rendered transparent (as shown in FIG. 8) so that only the selected choices 248 printed on the printed receipt 244 behind the display screen 120 of the voting machine 100 can be seen. The voter can easily compare the choices selected 248 from among the selectable choices 246 shown on the display screen 120 of the voting machine 100 with the selected choices 248 printed on the printed receipt 244 before the voter casts their final vote. Once the vote is accepted, the display screen 120 is once again made opaque as in FIG. 7 so that the voter's selections are no longer visible. In the alternative, the display screen 120 can be broken into segments so that the amount of the receipt 244 that is exposed can be adjusted to match the amount of information needing to be displayed to the voter. This will allow using less receipt paper per voter. Various methods for providing a transparent visual display screen can include, for example, using holographic backlit diffusing materials and/or any other mode for providing transparency to the display screen 120.

As shown by example in FIG. 3, the image recording device 200 is embodied as a reel-to-reel printer 280. The recording medium 210 of the reel-to-reel printer 280 is wound onto a flat surface 281 where the recording medium 210 is printed on. A print head 240 prints print data 242 on the recording medium 210. After the voter has reviewed and verified his selected choices 248, the print data 242 on the recording medium 210 is scrolled onto a motorized take-up reel 284. The print data 242 is printed to the recording medium 210 behind a clear window 232, so the voter cannot tamper with the recording medium 210.

An additional requirement for the printed receipt 244 in some jurisdictions is that it is stored in a random order so as to protect voter anonymity. Prior voting machines achieve this by cutting off each receipt and dropping it into a closed ballot box. This has the significant drawback that post-election handling, counting and storage of the receipts is unwieldy. The invention facilitates the random order with the use of bi-directional drive motors on both the supply and take-up reels of the reel-to-reel printer 280. Through the use of periodic indications on the paper, the position within the roll can be ascertained. The voting system can use a sensor appropriate to the method used for marking the paper. The voting system can then keep track of the paper position, and what portions of the paper roll are unused. When a receipt is to be printed, the voting system would, through the use of any standard randomizing method, choose a position for the receipt and, through the use of the bidirectional drive motors and paper position sensor mechanism, move the roll to that position before printing. Management of the paper and what portions are printed and blank, can be a function of either the printer mechanism 80 or the main voting machine, as appropriate to the design.

It should be understood that the image recording device 200 is not limited to a reel-to-reel printer 280 and can include various other types of printers, such as a sheet paper-printer, or any other type of printing device known or later developed and that can be implemented according to the voting system 10 of this invention. In addition, the recording medium 210 can include, for example, a thermal paper or any other print medium adapted for use with this invention.

The reel-to-reel printer 280 of FIG. 3 includes a supply reel 282 and a take-up reel 284. The recording medium 210 is fed from the supply reel 282, across a flat surface 281, and onto the take-up reel 284. Secrecy of the votes cast is also maintained by winding the printed receipt 244 forward onto the take-up reel 284 until the print data 242 on the printed receipt 244 is scrolled out of sight. This ensures that the next voter to use the voting system 10 cannot view how the prior voter cast his or her vote.

Ink is dispersed onto the recording medium 210 by the print head 240 to generate the print data 242. As shown in FIG. 3, the print head 240 can be adjustably located between the supply reel 282 and the take-up reel 284. The ink used in the print head 242 to produce the print data 242 can be any type of conventional ink used in a printing device. As will be discussed in greater detail below, special types of inks can also be implemented in accordance with this invention. Additionally, the printer may be of a thermal type printer.

FIG. 3 shows a cover 230 of the printer box 205 in an open position. The cover 230 of the printer box 205 includes the clear window 232 through which the printed receipt 244 on the recording medium 210 can be viewed. The clear window 232 provided for use with this invention can include, for example, a Plexiglas window or any other transparent medium through which an image can be seen.

According to this exemplary embodiment, the cover 230 is fastened to the container 220 by a locking device 250 and a lock-receiving device 260. In various exemplary embodiments, the locking device 250 and the lock-receiving device 260 can be replaced by any other suitable locking mechanism that is capable of being used with the present invention.

Security and prevention of tampering with the printed receipt 244 in the printer box 205 is of high importance according to the systems and methods of this invention. A number of security features can be incorporated with the printer box 205 to ensure that the printed receipts 244 are not altered or tampered with before, during, or after the election. These various security features fall into at least the following categories: 1) securing the printer box to the voting machine; 2) securing the printer box from tampering; 3) securing the connection between the printer box and the voting machine; 4) securing the recording medium; 5) securing the printing; and 6) providing a security paper.

Securing the printer box 205 to the voting machine 100 helps to ensure that the printer box 205 is not removed from the polling center by someone without authorization. The printer box 205 can have seals (as discussed later) attached at various locations in or around the printer box 205 to ensure that the printer box 205 is not detached from the voting machine 100 without detection. Such seals can be tamper-evident so that they show visible signs of forced removal, such as discoloration or tearing. In the alternative, locking mechanisms can be incorporated as part of the printer box 205. For example, using non-duplicatable keys or software interlocks can be provided. A software interlock links the physical locking mechanism of the printer box 205 to the software in the voting machine 100 to ensure that only authorized personnel can have access to the printer box 205.

FIG. 3 shows an exemplary locking mechanism according to another aspect of this invention. The printer box 205 may be secured to the voting machine 100, for example, by quarter turn fasteners 250, Velcro, and or any other type of commercially available fastener. Of course it should be understood that the fasteners 250 can be of any type, and may also be lockable, such as by being capable of receiving a padlock or the like, so that the fastener cannot be opened without unlocking the padlock. As described above with reference to FIGS. 4 and 5, one mechanism for fastening the printer box 205 to the voting machine 100 involves "slotting" which is similar to the mechanism for runners provided on sliding drawers. However, any device capable of securing the printer box 205 to the voting machine 100 can be used for fastening the printer box 205 to the voting machine 100 according to this invention.

Securing the printer box 205 itself from entry is another example of a security feature that can be incorporated into the printer box 205 to ensure that the printed receipts 244 are not altered or tampered with before, during, or after the election. For example, the printer box 205 may be sealed with a tamper-evident tape or by providing a locking mechanism (see, for example, FIG. 3). The level and type of security used can depend on whether the person who is allowed to gain entry of the printer box 205 is allowed to have access to the recording medium 210, for example, to change the recording medium 210 or deal with a mechanical fault that should occur within the printer box 205 during operation. Alternatively, a lock/unlock detection sensor 256 (FIG. 4) can be implemented into the box.

If a poll worker is not to be given permission to open the printer box 205, the entire printer box 205 can be configured to be changed when the recording medium 210 runs out. In this case, the security of the mechanism that attaches the recording medium 210 to the voting machine 100 is to be considered crucial. In order to determine if an unauthorized person has entered the printer box 205, various detection devices can be incorporated, for example, an RFID (Radio Frequency ID) can be integrated with printer box 205. That is, the printer box 205 can have an RFID or serial number attached to it or as part of the box 205 to ensure that the printer box 205 itself is: a) authorized; b) in its correct location; and c) to prevent the printer box 205 from being removed from the polling station without authorization.

Additionally, FIGS. 3 and 4 further illustrate the lock/unlock detection sensor 256. The lock/unlock detection sensor 256 can determine whether various components in the voting system 10 are locked or unlocked. For example, the lock/unlock detection sensor 256 can provide information to the controller about whether the cover 230 of the printer box 205 is open or closed. If the cover 230 is closed, operation of the voting system 10 will function normally. If, however, the cover 230 is open, the operation of the voting system 10 can be disabled.

Securing the connection between the printer box and voting machine is another example of a security feature that can be implemented in accordance with this invention. The printer box 205 can be designed so that it "slots" into the voting machine 100 for a cable-less connection, similar to the mechanism used by laptops in desktop stations. This type of connection can ensure that voters and/or other persons will not interfere with the connection between the printer box 205 and the voting machine 100 either accidentally or on purpose.

Securing the recording medium from access is yet another example of a security feature. Similar issues arise as to securing the recording medium 210. The exemplary recording medium 210 shown in FIG. 3 is a reel-to-reel printer 280. In order to prevent access to the recording medium 210, the recording medium 210 can be encased in a secure container or canister.

Figure 9:
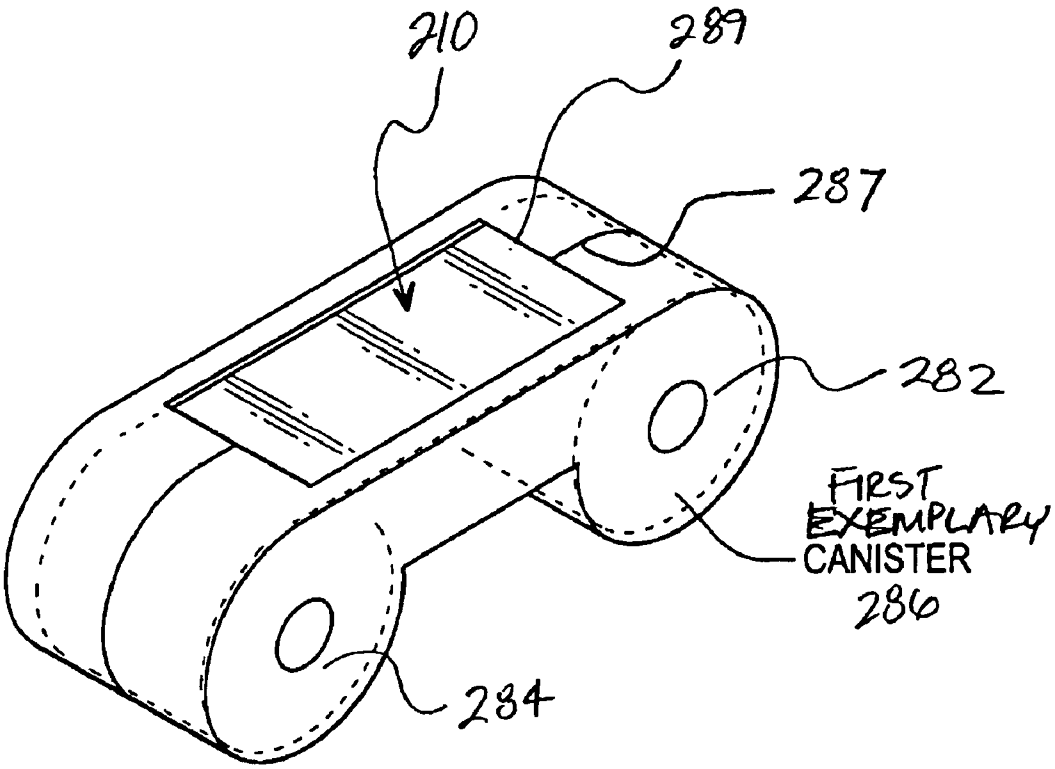
FIG. 9 shows a first exemplary canister configuration according to this invention.
Figure 10:
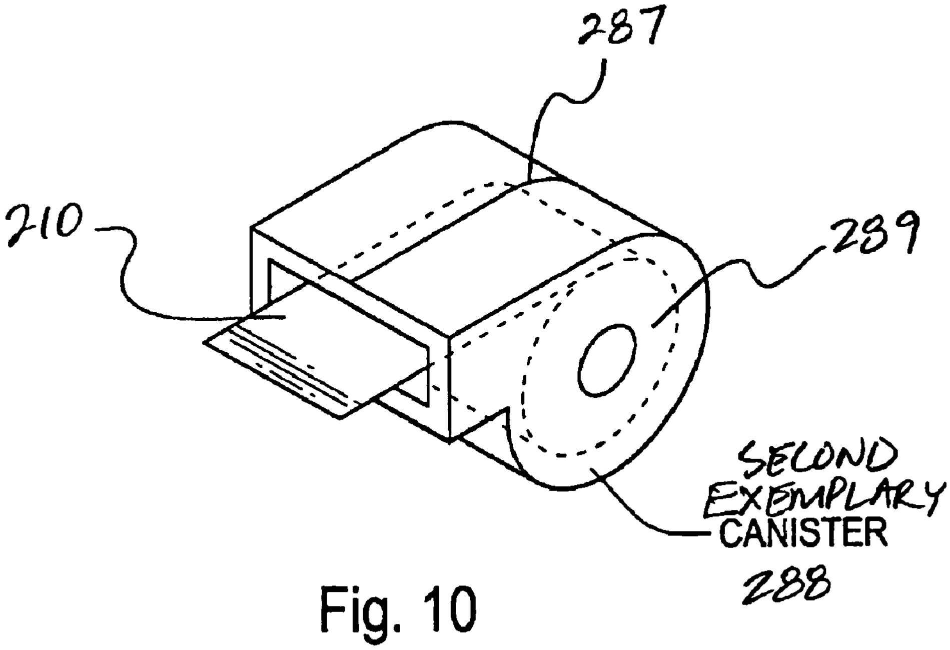
FIG. 10 shows a second exemplary canister configuration according to this invention.

FIGS. 9 and 10 show a first exemplary canister and a second exemplary canister configuration, respectively. In FIG. 9, both the supply reel 282 and the take-up reel 284 are encased in a first exemplary canister 286. The first exemplary canister 286 is similar in configuration to a 110 mm film canister that is removed as a single entity and cannot be opened without breaking a tamper-evident seal 287. The first exemplary canister 286 includes a canister window 289 through which the recording medium 210 can be viewed and printed on by the print head 240.

FIG. 10 illustrates a second exemplary canister 288 configuration. According to this configuration, a supply/take-up reel 289 is encased in the second exemplary canister 288. The second exemplary canister 288 is similar in configuration to a 35 mm film canister that is removed as a single entity and cannot be opened without breaking a tamper-evident seal 287. An auto-load mechanism can also be integrated for exchanging a new recording medium 210 in either the first 286 or the second 288 exemplary canisters when the previous recording medium 210 has been finished.

Both the first exemplary canister 286 and the second exemplary canister 288 can be provided with RFID tags and/or unique serial numbers attached. In order to remove the printed receipts 244 from the canisters 286, 288, the canisters 286, 288 will need to be disassembled, at which point the tamper-evident seal will be broken. The advantage of these canister configurations is that it allows access to the printer box 205 by poll workers and election officials in order to fix jams and/or provide other types of service, but retains the secrecy and security of the printed voting receipts 244 by preventing access to the recording medium 210.

Security printing using special types of ink is another example of a security feature that can be used in accordance with the systems and methods of the present invention. For example, the ink used in the print head 240 of the image recording device 200 can include security inks, such as an IR, a UV, a Fluorescence and the like. The purpose for providing this type of an ink is to further maintain security when printing the printed receipt 244. In this case, the printer box 205 can be adapted to contain LED's emitting light at a predetermined wavelength, in order for the voter to view the print data 242. According to one example, the LED's could be switched on, allowing the voter to view the printed receipt 244, and switch off once the voter has verified the accuracy of the printed receipt 244. This will ensure that the next voter cannot view any prior voting printed receipts 244.

In addition, "invisible" information can be added to the visible voting summary or printed receipt 244 to further ensure security that the printed receipt 244 is authentic and has not been tampered with.

Using specific types of recording medium or a security paper is another example that can ensure secure printing in accordance with the systems and methods of the present invention. For example, the recording medium 210 used in the reel-to-reel printer 280 could also have additional security features on it, for example, holograms, threads, intaglio print, watermarks and the like. The presence of this type of a security feature would make the recording medium 210 very difficult to counterfeit and provide additional assurance that the recording medium 210 was authentic and has not been tampered with.

According to the systems and methods of this invention, the image recording device 200 can print a variety of different types of information, in a number of different ways, by for example: 1) printing a summary of a voter's selected choices; 2) printing each transaction undertaken by the voter or pollworker; 3) printing each transaction as a coded number; 4) printing information relating to the voter; 5) printing information relating to the image recording device and/or the voting machine; 6) printing each transaction undertaken by poll workers; 7) printing small ballots; and 8) printing a carbon copy.

In particular, printing a summary of a voter's choices is an example of a precautionary step that can be taken to ensure the accuracy of the intended selected choices 248 by the voter prior to casting their vote in accordance with the systems and methods of the present invention. The summary of the voter's selected choices 248 may be readable by humans and/or may be machine-readable. In this way both a voter and the voting machine 100 can verify the accuracy of the printed receipt 244. The machine-readable printed receipt 244 can be scanned and used to cast a vote, or scanned in the case of a re-count, for example using OCR software or any other software capable of being used in accordance with the present invention.

Auditing the correct operation of the voting system is another important function available with the printer. To supplement the printed vote summary, the printer can print a record of each action taken by the voter and pollworker. With such a record, it is possible to reconstruct actions during the election and determine if there were failures, for example, to prevent controversy when a large number of voters apparently made the effort to come to the polls but cast blank ballots. This is a benefit that a simple summary printout of votes does not provide. The information printed in this mode could include the record of each screen touch made by the voter, additional operations such as canceling a ballot and maintenance functions, such as checking the touchscreen calibration. The form of the entries in this audit log could be of a form "Touch at X=123 Y=456", "Voter Activation Card Inserted", "Candidate X Selected", "Candidate Y deselected", etc. or any other human or machine readable method.

Printing each transaction undertaken by the voter in real-time is another example of the type of information that can be performed by the voting system 10. This can be performed at a logical level, for example "Tony Blair selected", "Tony Blair deselected," or at a raw input level, i.e., the screen coordinates of each touch the voter makes. Especially if the raw input is recorded, the recording function could be a mechanism totally independent of the voting machine 100, implemented either in software or as a separate hardware module. Recording the raw input has the advantage in that it verifies the operation of the voting machine 100, i.e., that the transaction recorded does in fact correspond to a screen coordinate or selected choice 248 that was touched.

Printing each transaction as a coded number is yet another example of the type of operation that can be performed by the voting system 10. As an alternative to the real-time printing described above, the image recording device 200 can print a unique number that relates to each transaction undertaken by the voter. This option would cut down on (or compress) the amount of information being printed, and could be printed either: a) at the end of voting, after a summary of the voter's candidate choices has been shown and verified by the voter; b) after a certain number of transactions have been carried out, for example after each 10 transactions; c) after each individual transaction, and/or d) each time a specific transaction is carried out, for example when the voter is asked "do you wish to continue?" and presses an "OK" button.

Printing information relating to the voter is an example of the type of information that can be printed by the image recording device 200 to ensure the identity and security of the voter. The image recording device 200 can print a random encryption code that ties the printed receipt 244 to the electronic selectable choices 246 reviewed by the voter, and in turn identifies the voter. This allows a complete audit trail log to be produced on the printed receipt, while maintaining the secrecy of the voter.

Printing information relating to the image recording device and/or the procedure by which security to the voting system 10 can be ensured. The image recording device 200 can print the serial number of the voting machine 100 that it is attached to, its own serial number, or any other information relating to where the image recording device 200 is located, including the time and type of election.

Printing each transaction undertaken by poll workers can also ensure security to the voting system 10. The image recording device 200 can print to the printed receipt 244 all mechanical operations undertaken on or to the voting machine 100 and/or the image recording device 200 during voting. For example, operations such as replacing the recording medium 210, opening the image recording device 200 to fix a jam, replacing the image recording device 200 and the like may be recorded, along with the name of the poll worker carrying out the transaction. This allows for a complete election audit trail to be produced on the printed receipt 244.

According to another aspect of the invention, the handling, reviewing and printing of large ballots are examples of the type of information that can be printed by the image recording device 200. None of the "receipt under glass" systems in the prior art have yet addressed how to handle ballots that are larger than the size of a window of a printer. In accordance with the present invention, it is an aspect of this invention to manage multiple pages, and perhaps to scroll the recording medium 210 backwards and forwards in the window of the printer box 205 based on the size of a ballot and the recording device window 207 of the printer box 205.

Figure 11:
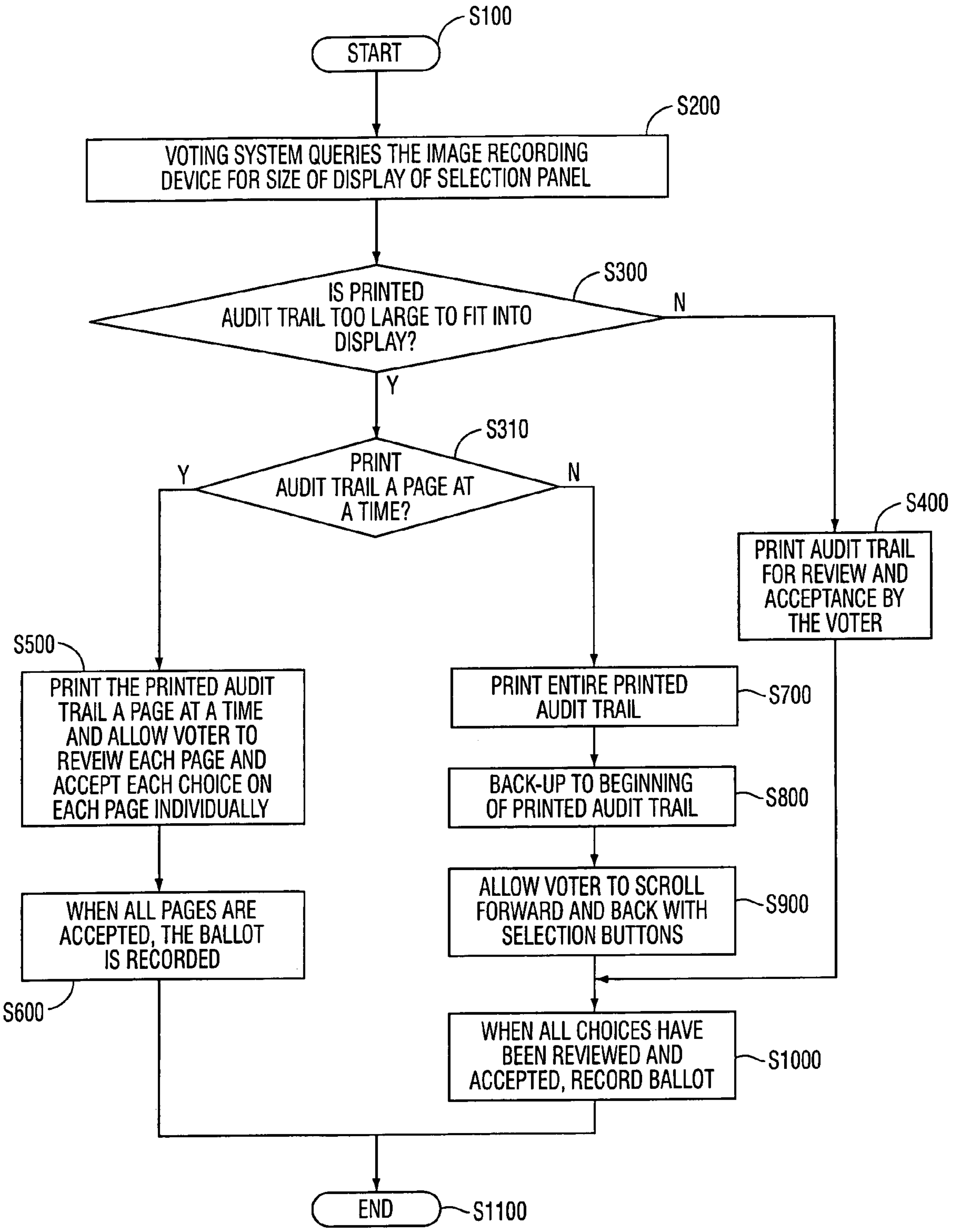
FIG. 11 illustrates a logic procedure adapted to handle printing large ballots according to this invention.

FIG. 11 illustrates a logic procedure adapted to handle printing large ballots according to the systems and methods of the invention.

In particular, a control routine begins at step S100. The control routine continues to step S200, where the voting system queries the image recording device for a size of a recording display window of a printer box of an image recording device. The objective is to handle ballots that are larger than the size of the recording device window. To do so requires logic to manage multiple pages, and perhaps to scroll the paper backward and forward in the recording device window. The control routine continues to step S300.

In step S300, the voting system determines whether a ballot is too large to fit into the recording device window of the printer box. If not, control proceeds to step S400 in which the printed audit trail is printed to the recording medium for review and acceptance by the voter. However, if in step S300 the printed receipt is too large to fit into the recording device window of the printer box, then control will proceed to step S310 where the voting system determines whether the audit trail is to be printed a page at a time. Depending on the decision of the voting system, either step S500 or step S700 is taken.

In step S500, the voting system will print the printed receipt one page at a time and allow the voter to review each page and accept each choice on each page individually. Control then proceeds to step S600.

In step S600, when all pages of the printed receipt have been reviewed and accepted, the ballot is recorded by the voting system. Control then proceeds to step S1100 in which the control routine ends.

If, however, in step S300 the printed audit trail is too large to fit into display, the control routine can be programmed to proceed to step S700 in which the entire printed receipt is printed all at once. Control then will continue to step S800.

In step S800, the control routine will cause the printed receipt to back up to the beginning of the printed receipt for review by the voter. Control then will proceed to step S900.

In step S900, the voting system allows the voter to scroll forward and backward over the printed receipt by operating specific selection buttons. The control routine then continues to step S1000.

In step S1000, when all choices in the printed receipt have been reviewed and accepted by the voter, the ballot is recorded. Control then proceeds to step S1100 in which this process ends.

Printing small ballots can also be managed by the image recording device 200 according to the systems and methods of the present invention. Considerable paper is wasted for small ballots if the recording device window 232 is too large, such as when the recording device window 232 is constructed large enough for the largest possible ballot. One solution is to implement a recording device window that is adjustable from election to election based on the number of items displayed in the recording device window. The amount of space required for printing onto the recording medium can be reduced by adjusting the location of the print head 240 relative to the recording medium 210. As a result, the amount of recording medium 210 used by each voter can be minimized where the entire amount of the recording medium exposed by the recording device window 232 is not necessary for printing.

Figure 15:
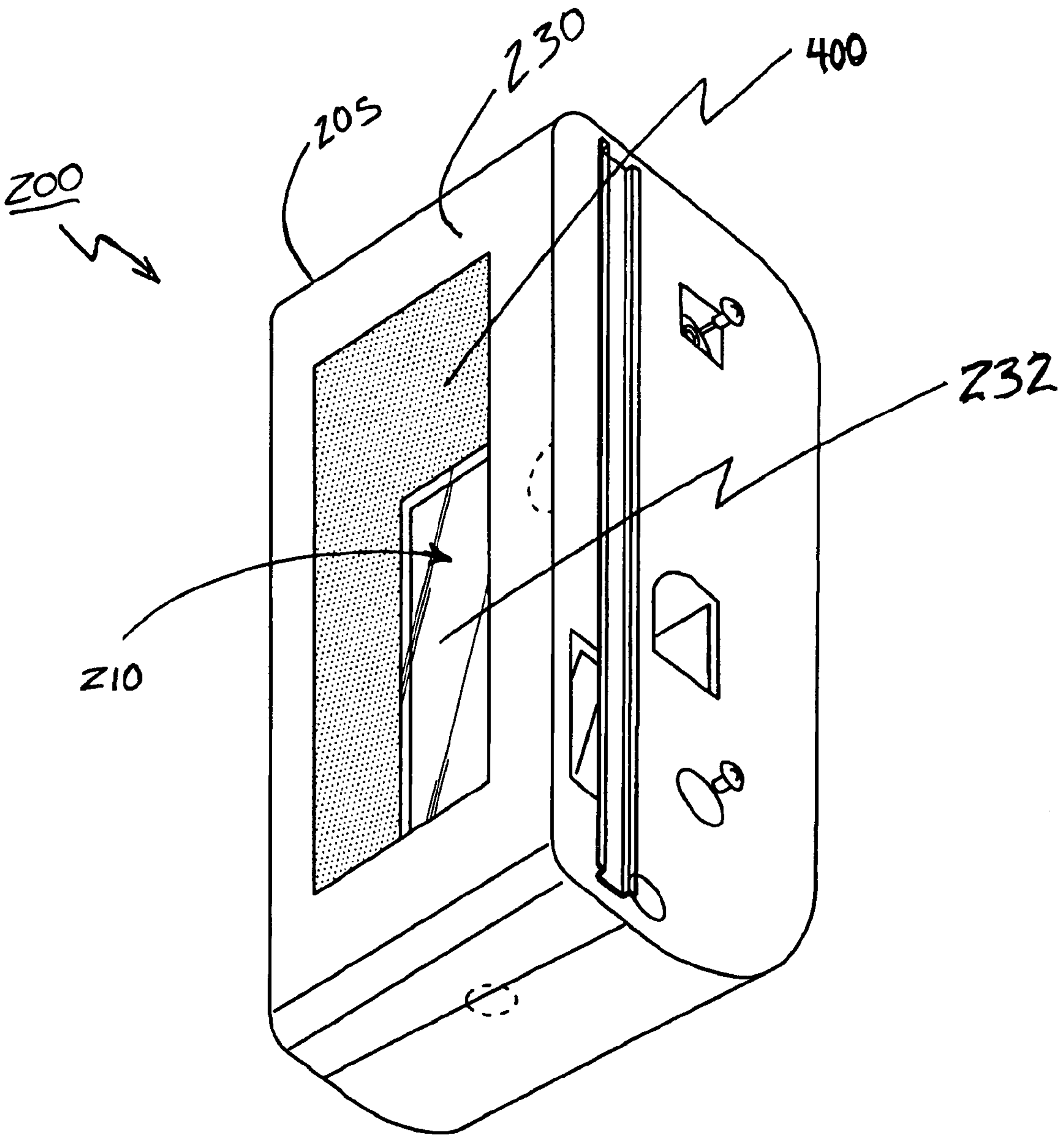
FIG. 15 shows an exemplary printer box having an adjustable recording device window in accordance with this invention.

Furthermore, as shown in FIG. 15, the recording device window 232 itself can be adjustable. The recording device window 232 can be reduced or enlarged based on the size of the ballot. This can be accomplished by inserting a mask or insert 400 over or under the recording device window 232. Alternatively the recording device window 232 can include a liquid crystal type mask that can variably become opaque so that only a portion or window of the recording device window 232 is transparent. In other words, based on the amount of space needed to view the selectable choices 246 on the recording medium 210, the liquid crystal type mask can be activated to create a corresponding transparent window encompassing the selected choice while "blacking out" the rest of the recording device window 232.

Further, when a mask or insert 400 is used, sensors can be implemented within the printer box 205 that sense the size of the mask 400 and transmit the size of the mask 400 to the controller 112. The controller 112 can then control the printing to occur in the visible portion of the recording device window 232. Also, the controller 112 can determine an appropriate size for the recording device window 232 based on the ballot and adjust the recording device window 232 accordingly so that it corresponds to selectable choices 246 displayed on the display screen 120 of the voting machine 100. With a mask or insert 400, this can include indicating to the pollworker which size mask 400 to insert. With a liquid crystal type mask, this can be more automated, whereby the controller instructs the liquid crystal type mask to adjust to an appropriate size, shape and location.

Figure 12:
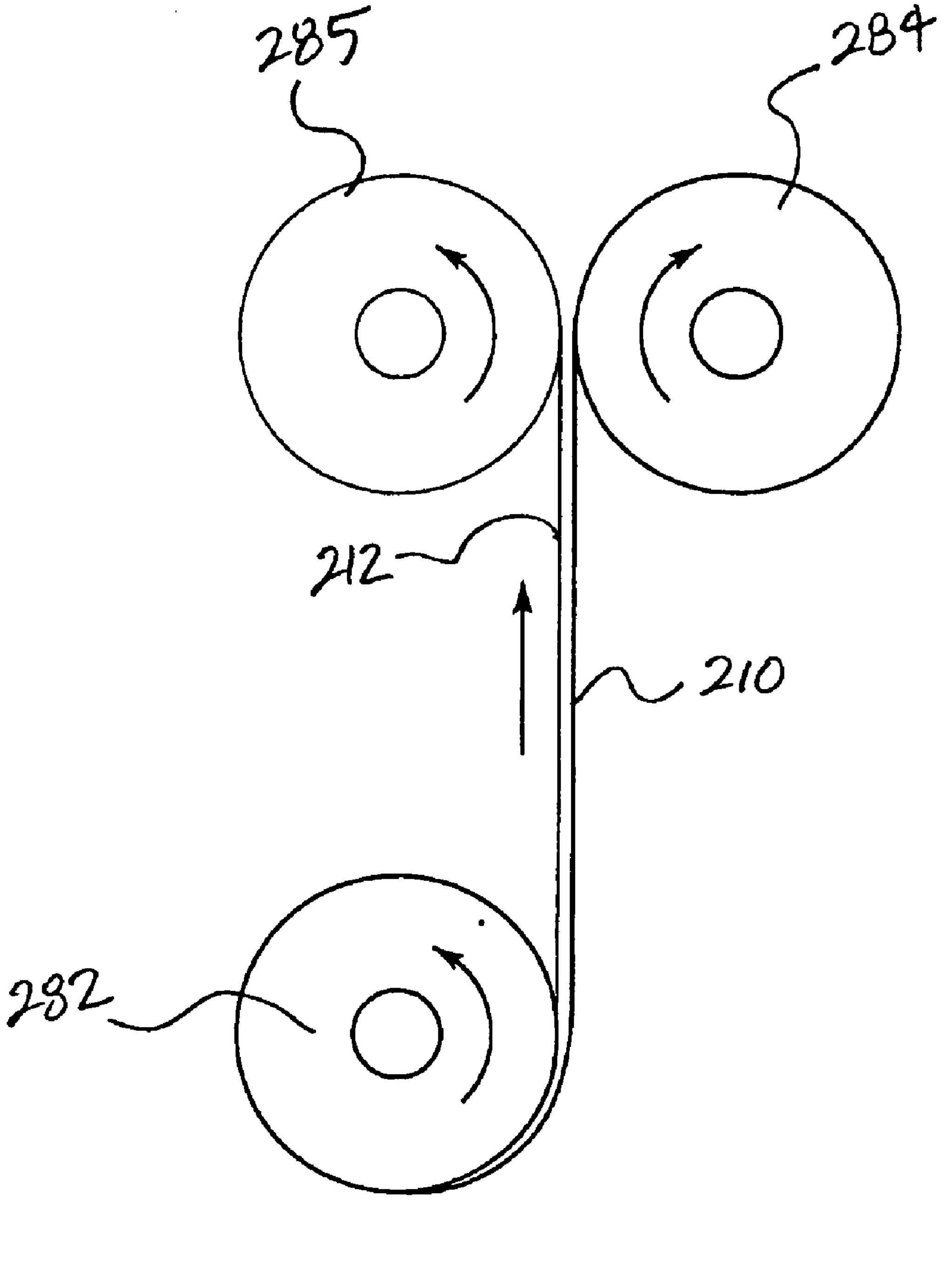
FIG. 12 shows an exemplary illustration of printing a carbon copy in accordance with this invention.

FIG. 12 shows an exemplary illustration of printing a carbon copy in accordance with the systems and methods of the present invention. The printed receipt 244 can be printed on a carbon paper to provide two paper ballot copies. In particular, FIG. 12 shows a reel-to-reel printer including a supply reel 282, a take-up reel 284 and a carbon copy take-up reel 285. The recording medium 210 is backed with a carbon copy 212. According to this embodiment of the invention, the paper on the supply reel 282 is split and wound onto two separate take-up reels. That is, inside of the printer box 205, the recording medium 210 is wound onto the take-up reel 284 and the carbon copy 212 is wound onto the carbon copy take-up reel 285. In this case, if any doubt is cast on the integrity of either the recording medium 210 or the carbon copy 212, the other set can be referred to for verification.

According to the systems and methods of this invention, various fail-safe devices can be implemented to alert pollworkers and voters of mechanical faults, reel changes and/or other problems. The voting system 10 can include, for example: 1) standard parallel or serial port control signals; 2) handshaking controls; 3) optical sensors; 4) paper detection sensors; 5) motion sensors; 6) lock/unlock detection sensors; and 7) paper-out sensors, and the like.

To detect whether the printer is still connected and operating, standard parallel or serial port control signals or special handshaking between the voting machine 100 and the printer box 205 can be incorporated. In operation, if the image recording device 200 stops responding to requests to print or is disconnected, the voting system 10 can be controlled to halt its voting operations and an error message is displayed which then holds up the voting.

Figure 13:
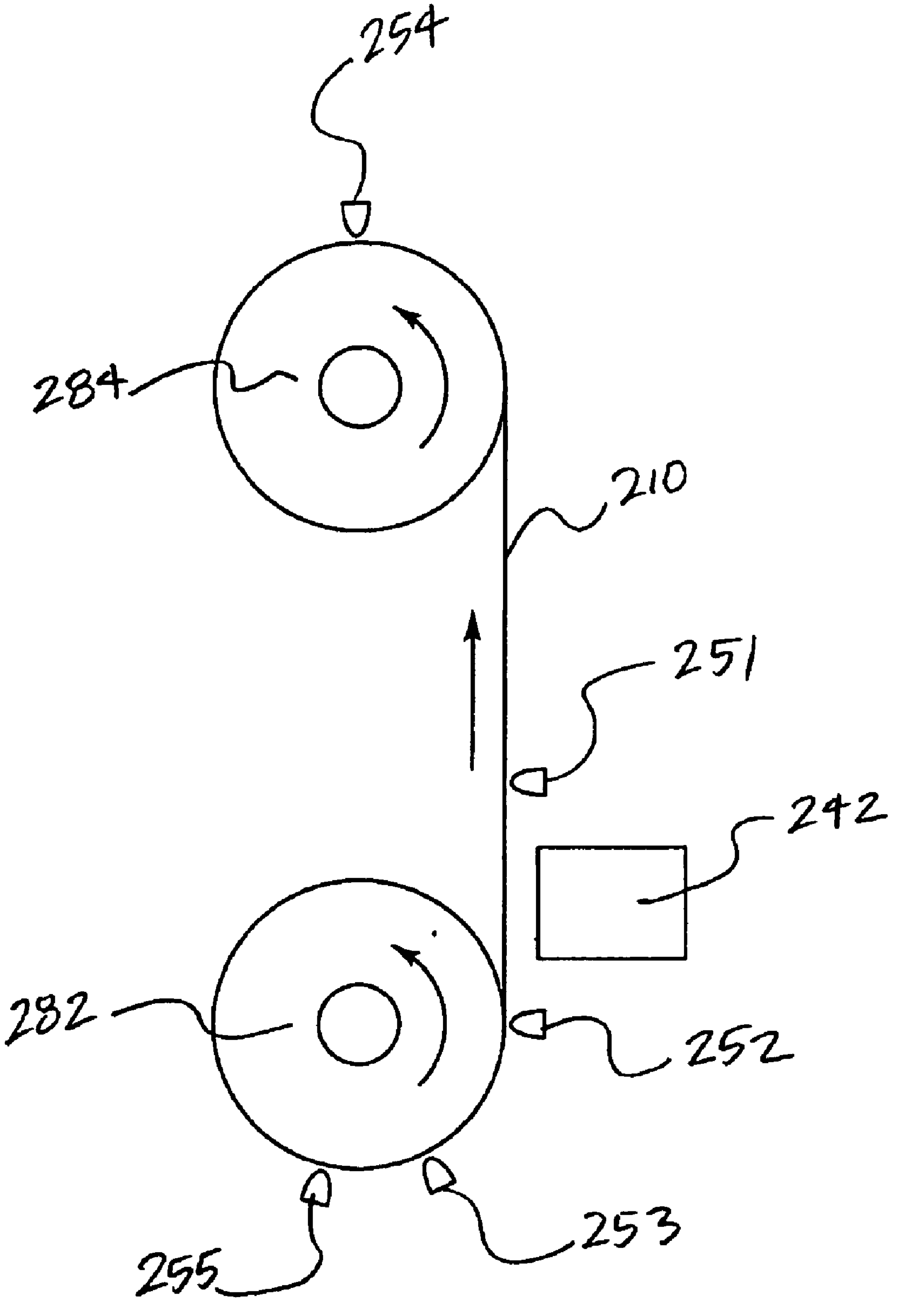
FIG. 13 shows exemplary fail safe devices adapted for use with the recording medium according to this invention.

FIG. 13 shows that in the event that the print head 240 fails to operate, a print head failure sensor 251 can be placed immediately after the print head 242 to detect whether the recording medium 210 coming from the print head 242 contains markings on the recording medium 210 to determined whether the print head 242 is functioning correctly.

According to the systems and methods of this invention, the sensors implemented in accordance with this invention can include, for example, optical, mechanical, electrical, solid state, magnetic, and the like, as well as any other type of sensor now known or later developed and that can be used in accordance with the present invention.

Handshaking between the voting machine 100 and the printer box 205 can also be implemented to determine whether normal operation is occurring between the two devices. In other words, the voting machine 100 and printer box 205 can electronically communicate with each other according to a pre-established communication protocol. Detecting that the voting machine 100 is not operating can take the form of periodic handshakes between the voting machine 100 and the printer box 205. That is the voting machine may periodically electronically interrogate the printer box 205 to ensure proper connection and operation. If the printer box 205 has a printed receipt 244 displayed and the voting machine 100 has stopped operating, an error code can be displayed on either the display screen 120 of the voting machine 100 or printed to the recording medium 210 to alert the voter that the voting system 10 is not operating correctly. In this case, the error code can be immediately printed on the printed receipt 244 and the recording medium 210 can then be advanced out of sight to maintain the privacy of the voters selected choices 248.

FIG. 13 further illustrates providing the ability to determine whether the recording medium 210 used is new or has already been printed. To ensure that the recording medium 210 coming out of the reel-to-reel printer 280 is blank, a raw paper detection sensor 252 can be placed immediately before the print head 240. Security to the recording medium 210 can be further ensured because it would be possible to determine whether a third party tampered with or pre-printed on the recording medium 210 and tried to pass it off as a "raw" recording medium having no markings thereon.

Additionally, FIG. 13 illustrates determining whether a paper jam is present. In particular, this can take the form of providing motion sensors 253, 254 at the supply reel 282 and the take-up reel 284 respectively. The motion sensors 253, 254 can communicate with the controller to sense and indicate whether a speed at the supply reel 282 appropriately corresponds to a speed at the take-up reel 284. This will ensure that the recording medium 210 is moving at an appropriate predetermined speed indicating that the recording medium 210 is not jammed.

FIG. 13 further illustrates consumable monitoring. That is, monitoring whether the image recording device 200 is out of the recording medium 210. FIG. 13 shows a paper-out sensor 255 located adjacent to the supply reel 282. It is an object of this invention to determine how much raw recording medium 210 is available and how much has been printed on, in terms of the number of printed receipts 244 for a given ballot size. Additionally, the sensors could be used to accurately position the paper.

According to this invention, various special needs can also be accommodated by the systems and methods of this invention. For example, those hard of hearing, those who have difficulty with sight, or those that require printing in another language can be accommodated by the voting system 10.

The printed receipt 244 can be printed in a machine-readable format, for example, on a paper-punch tape so that the printed receipt 244 can be scanned or read and converted into an audio account of the transaction record. Alternatively, OCR and text to speech technology could be used. This would allow blind or partially sighted users to verify the printed receipt 244 prior to casting their vote. Alternatively, an electronic record of the votes made could be kept and read back to the voter prior to the votes being cast.

The voting system 10 can be configured to accommodate several different languages for any voter in a language that the voter feels most comfortable in casting their vote. The printed data 242 on the display screen 120 of the voting machine 100 and/or the printed receipt 244 can be printed in the voter's native language, as well as English or any other language(s) required by voting laws. Alternatively, an English-language translation of a summary of the printed receipt 244 can be printed on the recording medium 210 after the voter has verified the printed receipt 244.

The voting system 10 can also be configured to accommodate a variety of different font sizes. That is, the printed receipt 244 can be printed in a larger font to aid those users with poor sight.

The clear window 232 located over the printed receipt 244 can have a magnifying effect to make it easier for the users that are far-sighted or have poor sight to more easily view the printed receipt 244.

In accordance with a further aspect of this invention, illumination can be provided to the clear window 232 in order to view the printed receipt 244. There is a fundamental mismatch in viewability between the, for example, backlit, high-contrast LCD screen of the display screen 120 used for the voting machine 100 and the illumination being provided to the printed receipt 244, especially in low light conditions. To help the mismatch in lighting characteristics, the clear window 232 can be illuminated. This illumination can be controlled by the voting machine 100, so that the clear window 232 is only turned on when there is a printed receipt 244 in the clear window 232. Alternatively, illumination of the clear window 232 can be controlled by sensors, such as for example, ambient light sensors, and the like.

In the former case, the clear window 232 may be illuminated to view the printed receipt 244 after he or she has picked all their choices. Illumination can also occur just before the printed receipt 244 is wound onto the take-up reel 284, but before the next voter has approached the voting system 10 to casts his or her vote, thereby ensuring the votes are kept secret. As mentioned before, the illumination may also consist of LED's emitting light at different wavelengths to reveal IR, UV, Fluorescence or other security inks.

Figure 14:
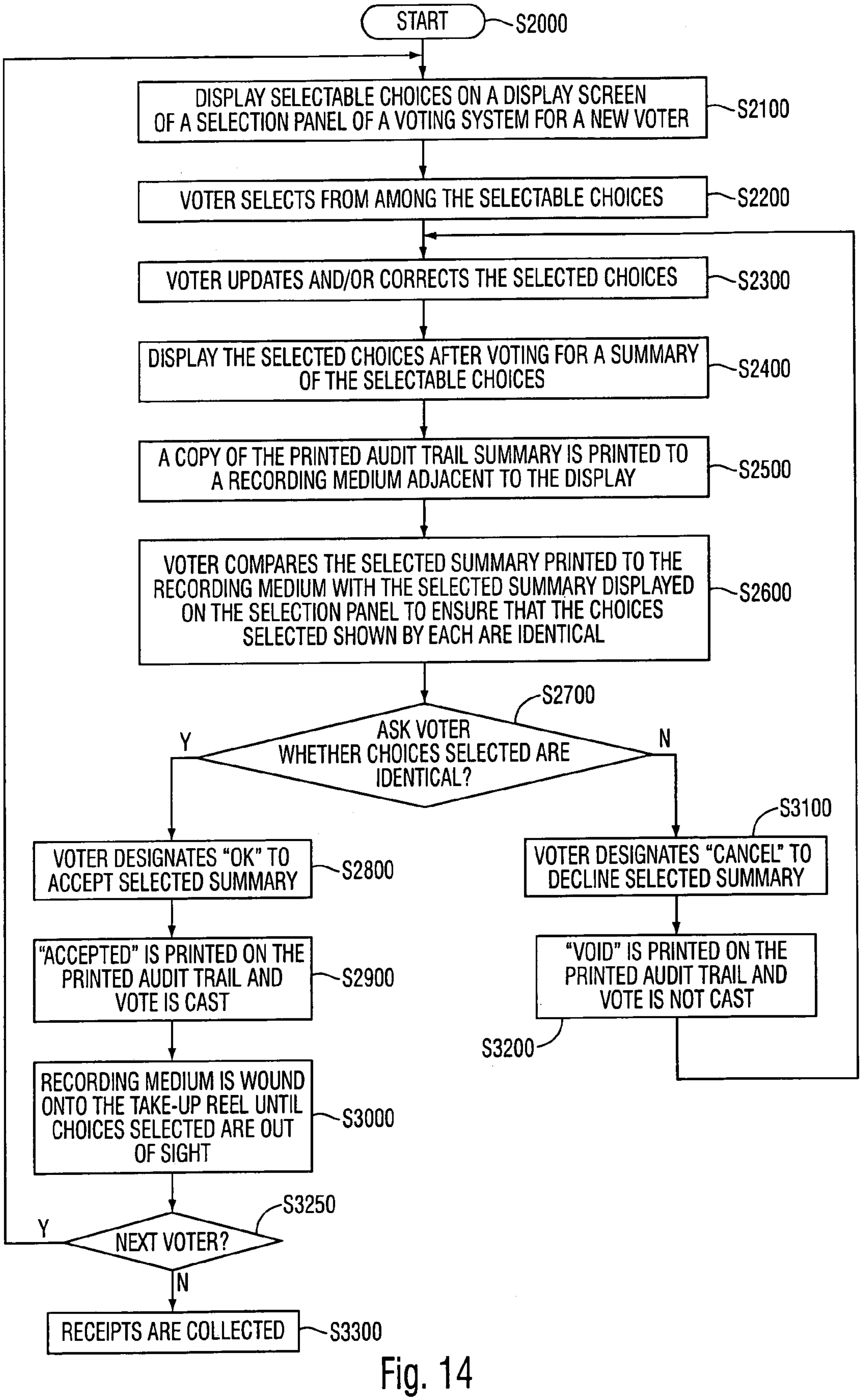
FIG. 14 shows an exemplary method for voting according to this invention.

FIG. 14 shows an exemplary method for voting according to the systems and methods of the present invention.

In particular, a control routine begins in step S2000. The control routine continues to step S2100, where selectable choices are displayed on a display screen of a selection panel of a voting system for a new voter. The control routine then continues to step S2200.

In step S2200, the voter selects from among the displayed selectable choices. Control then proceeds to step S2300.

In step S2300, the voter updates and/or corrects the selected choices that they have chosen. Control then continues to step S2400.

In step S2400, the voting system displays a summary of selected choices on the display screen of the selection panel after the voter has viewed and voted from among some of the selectable choices. Control continues to step S2500.

In step S2500, a copy of the summary of the selected choices is printed as a printed receipt (or printed audit trail)

to a recording medium adjacent to the display screen. Control then continues to step S2600.

In step S2600, the voter compares the summary of selected choices printed to the recording medium with the selected summary displayed on the display screen of the selection panel to ensure that the choices selected printed on the recording medium are identical to the choices selected on the display screen. Control then continues to step S2700.

In step S2700, a determination is made whether the choices selected by the voter are identical. If not, control proceeds to step S3100 in which the voter designates "CANCEL" to decline the summary of choices selected. Control then continues to step S3200.

In step S3200, "void" or the like is printed on the printed receipt and the vote is not cast. The control routine then returns to step S2300 in which the voter is then again allowed to update and/or correct the selected choices previously chosen.

However, if in step S2700, the selected choices are identical, the control routine proceeds to step S2800.

In step S2800, the control routine determines that the voter to accepts the summary of the selected choices. Then, the control routine proceeds to step S2900.

In step S2900, the term "ACCEPTED" or the like is printed on the printed receipt and the vote is cast. The control routine then proceeds to step S3000.

In step S3000, the recording medium is advanced on an image recording device until the selected choices are out of sight so that the next voter using the voting system cannot view how the previous voter cast his or her vote. Control then proceeds to step S3250 where a decision is made whether there is a new voter. If there is no new voter, then control will proceed to step S3300.

In step S3300, the receipts are collected and taken to a secure location to be stored as required by law. Otherwise, if there is a new voter, control proceeds to step S2100 in which a new set of selectable choices are displayed on the display screen of a selection panel of the voting system for a new voter. The control routine then repeats itself again from step S2100 through steps S3250.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A voting machine, comprising:

a display that displays a ballot having election choices and receives voter selections; and a printer including a tamper resistant container for a print medium, the printer being coupled with the voting machine and printing a printed audit trail on the print medium, wherein the voter selections and the printed audit trail can be viewed by the voter, and the tamper resistant container includes a transparent window to allow the voter to view the printed audit trail and restrict physical access to the printed audit trail.

2. The voting machine as recited in claim 1, wherein the voter selections and the printed audit trail are simultaneously viewed by the voter.

3. The voting machine as recited in claim 1, wherein once the voter has viewed the voter selections and the printed audit trail, the printer moves the printed audit trail such that the printed audit trail is not visible to a next voter and is stored within the tamper resistant container.

4. The voting machine as recited in claim 1, wherein:

the printer marks the printed audit trail to indicate that the printed audit trail is invalid if the voter rejects the voter selections as presented in the printed audit trail; and the display displays the ballot having election choices to receive voter reselections.

5. The voting machine as recited in claim 1, wherein the printer is within the voting machine.

6. The voting machine as recited in claim 5, wherein the printer is accessed separately from the voting machine.

7. The voting machine recited in claim 1, wherein the printer is a separate device that is attached to the voting machine.

8. The voting machine as recited in claim 7, wherein the printer includes a first fastener and the voting machine includes a second fastener, wherein the first fastener engages the second fastener in a slotting manner.

9. The voting machine as recited in claim 7, wherein the printer is attached to the voting machine using a commercially available fastener.

10. The voting machine as recited in claim 7, further comprising at least one fastener that attaches the printer to the voting machine.

11. The voting machine as recited in claim 10, wherein the at least one fastener includes at least one security feature that includes at least one of a locking mechanism, tamper evident tape, alarms and electronic identification.

12. The voting machine as recited in claim 11, wherein the locking mechanism is a lock that is unlocked using a non-duplicatable key.

13. The voting machine as recited in claim 1, further comprising:

a radio frequency identification detector included in the voting machine; and a radio frequency identification device included in the printer, wherein the radio frequency identification detector of the voting machine detects the radio frequency identification device of the printer when the printer is attached to the voting machine to confirm an attachment of a valid and/or authorized printer to the voting machine.

14. The voting machine as recited in claim 13, wherein the voting machine is disabled unless radio frequency identification detector detects that the valid and/or authorized printer is attached to the voting machine.

15. The voting machine as recited in claim 1, further comprising:

a radio frequency identification detector included in the printer; and a radio frequency identification device included in the voting machine, wherein the radio frequency identification detector of the printer detects the radio frequency identification device of the voting machine when the printer is attached to the voting machine to confirm an attachment of a valid and/or authorized voting machine.

16. The voting machine as recited in claim 15, wherein the printer is disabled unless radio frequency identification detector detects that the printer is attached to the valid and/or authorized voting machine.

17. The voting machine as recited in claim 1, wherein at least one of the voting machine and the printer is disabled unless the printer is attached to the voting machine.

18. The voting machine as recited in claim 1, wherein the print medium of the printer is stored on a reel-to-reel type print medium feeding system.

19. The voting machine recited in claim 1, wherein the printer is at least one of a laser, ink jet, thermal and dot-matrix type printer.

20. The voting machine as recited in claim 1, further comprising privacy shields disposed on the voting machine that restrict a visibility of a display screen of the display and the printed audit trail only to the voter.

21. The voting machine as recited in claim 1, further comprising privacy shields that are attached to the printer.

22. The voting machine as recited in claim 1, wherein a position of the printed audit trail can be detected by the printer, in order to print respective printed audit trails in a randomized order.

23. The voting machine as recited in claim 22, wherein the voting machine includes a controller that randomizes a printed position of the audit trail by keeping track of a print medium print position and portions of the print medium.

24. The voting machine as recited in claim 1, wherein the tamper resistant container is a canister that is removable from the printer.

25. The voting machine as recited in claim 24, wherein the canister includes at least one security feature that restricts access to the print medium contained therein.

26. The voting machine as recited in claim 25, wherein the at least one security feature includes at least one of a locking mechanism, tamper evident tape, alarms and electronic identification.

27. The voting machine as recited in claim 1, wherein the tamper resistant container includes a serial number.

28. The voting machine as recited in claim 1, wherein the print medium includes at least one security feature to ensure an authenticity of the printed audit trail.

29. The voting machine, as recited in claim 28, wherein the least one security feature is a security ink that is printed on the print medium, the security ink including at least one of an infrared, ultraviolet and fluorescent ink.

30. The voting machine as recited in claim 28, wherein the at least one security feature includes an invisible portion and a visible portion that is printed on the print medium.

31. The voting machine as recited in claim 28, wherein the at least one of the security feature of the print medium includes at least one of invisible data and visible data that is present on the print medium.

32. The voting machine as recited in claim 28, wherein the at least one security feature of the printing medium is printed on the print medium by the printer.

33. The voting machine as recited in claim 1, wherein the display further comprises a selection panel that receives the voter selections.

34. The voting machine as recited in claim 33, wherein the selection panel includes at least one selection button.

35. The voting machine as recited in claim 33, wherein the selection panel is configured to receive a ballot, the selection panel including a protective cover to hold the ballot.

36. The voting machine as recited in claim 33, wherein the selection panel includes a touch screen that is integrated with a display screen of the display.

37. The voting machine as recited in claim 33, wherein the printer is attached to a side of the selection panel.

38. The voting machine as recited in claim 37, further comprising:

a privacy shield disposed between the selection panel and the printer; and a window formed at the privacy shield to allow the voter to view the printed audit trail of the printer.

39. The voting machine as recited in claim 1, wherein the printer and the voting machine include integral contacts such that when the printer is attached to the voting machine, at least one of power up and data communication between the voting machine and the printer is initiated.

40. A voting machine, comprising:

a display that displays a ballot having election choices and receives voter selections; and a printer including a tamper resistant container for a print medium, the printer being coupled with the voting machine and printing a printed audit trail on the print medium, wherein the voter selections and the printed audit trail can be viewed by the voter, the printer is positioned behind a display screen of the display, and the voting machine further comprises a controller that causes the display screen to be segmentally made transparent such that at least one portion of the printed audit trail that should be viewed by the voter can be viewed through the display screen.

41. The voting machine as recited in claim 40, wherein the printer is positioned behind a display screen of the display.

42. The voting machine as recited in claim 41, wherein the display screen can be made transparent so that the printed audit trail can be viewed through the display screen.

43. The voting machine as recited in claim 42, wherein only a portion of the display is made transparent.

44. The voting machine as recited in claim 42, wherein, when the display screen is made transparent, the voter selections from the election choices remain visible so that the voter can compare the voter selections with the printed audit trail.

45. The voting machine as recited in claim 42, wherein the voter selections in the display screen are aligned with the printed voter selections in the printed audit trail so that when the display screen is made transparent, the voter selections in the display screen remain visible so that the voter can compare the voter selections in the display screen with the printed audit trail.

46. The voting machine as recited in claim 42, wherein the display screen is made of at least one of an amorphous silicon, a non-reflective display and a single large cell LCD.

47. The voting machine as recited in claim 42, wherein the display screen uses holographic backlit diffusing materials.

48. A voting machine, comprising:

a display that displays a ballot having election choices and receives voter selections; and a printer including a tamper resistant container for a print medium, the printer being coupled with the voting machine and printing a printed audit trail on the print medium, wherein the voter selections and the printed audit trail can be viewed by the voter, the printer is positioned behind a display screen of the display, the display screen can be made transparent so that the printed audit trail can be viewed through the display screen, and the voting machine further comprises a controller that causes the display screen to be opaque, causes the display screen to be transparent to allow the voter to view the printed audit trail on the print medium through the display screen, and then causes the display screen to be opaque so that a next voter can not view the print medium through the display screen.

49. A voting machine, comprising:

a display that displays a ballot having election choices and receives voter selections; and a printer including a tamper resistant container for a print medium, the printer being coupled with the voting machine and printing a printed audit trail on the print medium, wherein the voter selections and the printed audit trail can be viewed by the voter, a position of the printed audit trail can be detected by the printer, in order to print respective printed audit trails in a randomized order, the voting machine includes a controller that randomizes a printed position of the audit trail by keeping track of a print medium print position and portions of the print medium, and the printer includes at least one bi-directional drive motor that is controlled by the controller to randomize a printed position of the audit trail.

50. A voting machine, comprising:

a display that displays a ballot having election choices and receives voter selections; and a printer including a tamper resistant container for a print medium, the printer being coupled with the voting machine and printing a printed audit trail on the print medium, wherein the voter selections and the printed audit trail can be viewed by the voter, the tamper resistant container is a canister that is removable from the printer, and the voting machine further comprises an auto-load mechanism that loads/unloads canisters.

51. A voting machine, comprising:

a display that displays a selection of a voter;

a printer including a window, the printer being coupled to the voting machine and printing the selection of the voter as a printed audit trail on a print medium, and displaying the printed audit trail behind the window, so that the printed audit trail is tamper resistant and not physically accessible by the voter.

52. The voting machine as recited in claim 51, wherein the voter selection and the printed audit trail being arranged so that they can be simultaneously viewed by the voter.

53. The voting machine as recited in claim 51, wherein once the voter has viewed the voter selection and the printed audit trail, the printer moves the printed audit trail such that the printed audit trail is not visible to a next voter and stored within the printer.

54. The voting machine as recited in claim 51, wherein:

the printer marks the printed audit trail to indicate that the printed audit trail is invalid if the voter rejects the voter selections as presented in the printed audit trail; and the display displays the ballot having election choices to receive voter reselections.

55. The voting machine as recited in claim 51, wherein the printer is within the voting machine.

56. The voting machine as recited in claim 55, wherein the printer is accessed separately from the voting machine.

57. The voting machine recited in claim 51, wherein the printer is a separate device that is attached to the voting machine.

58. The voting machine as recited in claim 57, further comprising at least one fastener that attaches the printer to the voting machine.

59. The voting machine as recited in claim 51, further comprising:

a radio frequency identification detector included in voting machine; and a radio frequency identification device included in the printer, wherein the radio frequency identification detector of the voting machine detects the radio frequency identification device of the printer when the printer is attached to the voting machine to confirm an attachment of a valid and/or authorized printer to the voting machine.

60. The voting machine as recited in claim 59, wherein the voting machine is disabled unless radio frequency identification detector detects that the valid and/or authorized printer is attached to the voting machine.

61. The voting machine as recited in claim 51, further comprising:

a radio frequency identification detector included in the printer; and a radio frequency identification device included in the voting machine, wherein the radio frequency identification detector of the printer detects the radio frequency identification device of the voting machine when the printer is attached to the voting machine to confirm an attachment of a valid and/or authorized voting machine.

62. The voting machine as recited in claim 61, wherein the printer is disabled unless radio frequency identification detector detects that the printer is attached to the valid and/or authorized voting machine.

63. The voting machine as recited in claim 51, wherein at least one of the voting machine and printer is disabled unless the printer is attached to the voting machine.

64. The voting machine as recited in claim 51, wherein the printer is positioned with the window behind a display screen of the display.

65. The voting machine as recited in claim 64, wherein the display screen can be made transparent so that the printed audit trail can be viewed through the display screen.

66. The voting machine as recited in claim 65, wherein only a portion of the display screen is made transparent.

67. The voting machine as recited in claim 65, wherein, when the display screen is made transparent, the voter selections from the election choices remain visible so that the voter can compare the voter selection with the printed audit trail.

68. The voting machine as recited in claim 65, wherein the voter selection in the display screen is aligned with the printed voter selection in the printed audit trail so that when the display screen is made transparent, the voter selection in the display screen remain visible so that the voter can compare the voter selection in the display screen with the printed audit trail.

69. The voting machine as recited in claim 65, further comprising a controller that causes the display screen to be opaque, causes the display screen to be transparent to allow the voter to view the printed audit trail on the print medium through the display screen, and then causes the display screen to be opaque so that a next voter can not view the print medium through the display screen.

70. The voting machine as recited in claim 65, wherein the display screen is made of at least one of an amorphous silicon, a non-reflective display and a single large cell LCD.

71. The voting machine as recited in claim 65, wherein the display screen uses holographic backlit diffusing materials.

72. The voting machine as recited in claim 51, wherein the print medium of the printer is stored on a reel-to-reel type print medium feeding system.

73. The voting machine recited in claim 51, wherein the printer is at least one of a laser, ink jet, thermal and dot-matrix type printer.

74. The voting machine as recited in claim 51, further comprising:

privacy shields disposed on the voting machine that restrict a visibility of a display screen of the display and the printed audit trail only to the voter.

75. The voting machine as recited in claim 51, further comprising privacy shields attached to the printer.

76. The voting machine as recited in claim 51, wherein a position of the printed audit trail can be detected by the printer, in order to print respective printed audit trails in a randomized order.

77. The voting machine as recited in claim 51, wherein the printer includes a tamper resistant holder for the print medium on which is printed audit trails, with access to the print medium in the tamper resistant holder being restricted.

78. The voting machine as recited in claim 77, wherein the tamper resistant holder is a canister that is removable from the voting machine.

79. The voting machine as recited in claim 78, wherein the canister includes at least one security feature that restricts access to the printing medium contained therein.

80. The voting machine as recited in claim 79, wherein the at least one security feature includes at least one of a locking mechanism, tamper evident tape, alarms and electronic identification.

81. The voting machine as recited in claim 51, wherein the print medium includes at least one security feature to ensure an authenticity of the printed audit trail.

82. The voting machine, as recited in claim 81, wherein the at least one security feature is a security ink that is printed on the print medium, the security ink including at least one of an infrared, ultraviolet and fluorescent ink.

83. The voting machine as recited in claim 81, wherein the security feature includes an invisible portion and a visible portion that is printed on the print medium.

84. The voting machine as recited in claim 81, wherein the security features of the print medium include at least one of invisible data and visible that is present on the print medium.

85. The voting machine as recited in claim 81, wherein the security feature of the print medium is printed on the print medium by the printer.

86. The voting machine as recited in claim 51, wherein the printer and the voting machine include integral contacts such that when the printer is attached to the voting machine, power up and/or data communication is initiated between the voting machine and the printer.

87. The voting machine as recited in claim 51, wherein the voting machine communicates with the printer using at least one of a cable and a cable-less connection.

88. The voting machine as recited in claim 51, wherein the voting machine communicates with the printer using at least one of a parallel interface, a serial interface, a Universal Serial Bus (USB) interface, a Firewire interface, 801-11 interface, Bluetooth and a Peripheral Connection Interface (PCI) Express.

89. The voting machine as recited in claim 51, further comprising rails for receiving and coupling the printer to the voting machine in a slotting manner.

90. The voting machine as recited in claim 51, wherein the printer is secured to the voting machine by a locking mechanism.

91. The voting machine as recited in claim 51, wherein the printer further comprising a container including a cover, wherein the cover contains the window.

92. The voting machine as recited in claim 91, wherein the cover is fastened to the container by a locking device and a lock-receiving device.

93. The voting machine as recited in claim 92, further comprising a software interlock that is linked with at least one of the locking device and the lock-receiving device, wherein the lock-receiving device releases the locking device via the software interlock.

94. The voting machine as recited in claim 51, wherein the printer has at least one seal that shows signs of removal if the printer is detached from the voting machine.

95. The voting machine as recited in claim 51, further comprising at least one lock/unlock detection sensor that detects whether at least one component of the voting machine is locked/unlocked; and a controller that disables the voting machine if the at least one component of the voting machine is unlocked.

96. The voting machine as recited in claim 51, wherein the printer uses an invisible ink to print the printed audit trail, the printer further comprising a light emitting source that emits a light that causes an invisibly printed audit trail to become visible to the voter.

97. The voting machine as recited in claim 51, wherein the voting machine is configured to be coupled with a remote database.

98. The voting machine as recited in claim 97, wherein the voting machine is wired/wirelessly coupled to the remote database through a network.

99. The voting machine as recited in claim 97, wherein the voting machine is directly wired/wirelessly coupled to the remote database.

100. The voting machine as recited in claim 51, wherein the printer further comprising a memory that stores the selection of the voter.

101. The voting machine as recited in claim 51, wherein the voting machine includes a removable electronic storage device that stores the selection of the voter.

102. The voting machine as recited in claim 51, wherein the voting machine includes a memory that stores the selection of the voter.

103. The voting machine as recited in claim 51, wherein the printer prints each transaction undertaken on the voting machine.

104. The voting machine as recited in claim 103, wherein the printer prints each transaction as a code.

105. The voting machine as recited in claim 51, wherein the printer prints a summary of the selection of the voter.

106. The voting machine as recited in claim 51, wherein the printer prints a carbon copy of the selection of the voter.

107. The voting machine as recited in claim 51, wherein the printer prints each action undertaken on the voting machine.

108. The voting machine as recited in claim 51, wherein the printer prints a code that can be used to identify the voter.

109. The voting machine as recited in claim 51, further comprising a controller that determines whether the printed audit trail is larger than the printer window, and the controller determining whether an entire printed audit trail is to be printed or the printed audit trail is to be printed sectionally, each section corresponding to at least a portion of the printer window, if the printed audit trail is larger than the printer window.

110. The voting machine as recited in claim 109, wherein the controller causes the printer to print the printed audit trail a section at a time.

111. The voting machine as recited in claim 109, wherein the controller causes the printer to print an entire printed audit trail, and allows the entire printed audit trail to be scrolled back and forth based on the voter's input.

112. The voting machine as recited in claim 51, further comprising a mask that is inserted at the printer window to adjust a size of the printer window when the printed audit trail is smaller than the printer window.

113. The voting machine as recited in claim 112, further comprising:

at least one sensor that senses the mask at the printer window; and a controller, upon input from the sensor, causes the printer to print corresponding to a non-masked portion of the printer window.

114. The voting machine as recited in claim 51, further comprising a controller that determines whether the printed audit trail is smaller than the printer window, and the controller reduces a space allocated for printing on the print medium, if the printed audit trail is smaller than the printer window.

115. The voting machine as recited in claim 51, further comprising a controller that determines whether the printed audit trail is smaller than the printer window, and the controller adjusts the printer window size to accommodate the smaller sized printed audit trail.

116. The voting machine as recited in claim 115, further comprising:

the printer window including an adjustable liquid crystal type mask; and the controller causes the adjustable liquid crystal type mask to create a corresponding transparent portion in which the printed audit trail is visible and create an opaque remaining portion.

117. The voting machine as recited in claim 116, wherein the controller causes the printer to print corresponding to the transparent portion of the adjustable liquid crystal type mask.

118. The voting machine as recited in claim 51, further comprising a sensor that senses a print head failure.

119. The voting machine as recited in claim 51, further comprising a sensor that senses a paper jam.

120. The voting machine as recited in claim 51, further comprising a sensor that senses whether a portion of the print medium to be printed is blank prior to printing on the print medium.

121. The voting machine as recited in claim 51, further comprising a sensor that is used to accurately position the print medium.

122. The voting machine as recited in claim 51, further comprising a sensor that senses an amount of print medium available for printing.

123. The voting machine as recited in claim 51, further comprising a controller that interrogates the printer to detect whether the printer is properly functioning.

124. The voting machine as recited in claim 123, wherein the controller causes the display to display an error message if the printer is not properly functioning.

125. The voting machine as recited in claim 51, further comprising a controller that interrogates the voting machine to detect whether the voting machine is properly functioning.

126. The voting machine as recited in claim 125, wherein the controller causes the printer to print an error code on the print medium if the voting machine is not properly functioning.

127. The voting machine as recited in claim 51, further comprising:

the printer prints the printed audit trail in machine-readable format; and a converter that converts the machine-readable format of the printed audit trail into an audible audit trail output.

128. The voting machine as recited in claim 51, wherein the voting machine is configured to accommodate various languages.

129. The voting machine as recited in claim 128, wherein the printer prints an English-language translation of the audit trail printed in a foreign language.

130. The voting machine as recited in claim 51, wherein the printer is configured to print in various fonts.

131. The voting machine as recited in claim 51, wherein the printer window has a magnifying effect.

132. The voting machine as recited in claim 51, wherein illumination can be selectively provided at the window.

133. A method of operating a voting machine, comprising:

displaying election choices to a voter;

receiving a selection from the voter;

displaying the selection of the voter;

printing a printed audit trail of the selection of the voter onto a print medium; and displaying the printed audit trail behind a window so that the printed audit trail is tamper resistant.

134. The method of operating a voting machine as recited in claim 133, wherein the printed audit trail and the voter selection are simultaneously displayed to the voter.

135. The method of operating a voting machine according to claim 133, wherein once the voter has viewed the voter selection and the printed audit trail, the method further includes moving the printed audit trail such that the printed audit trail is not visible to a next voter and storing the printed audit trail within the printer.

136. The method of operating a voting machine according to claim 133, further comprising:

marking the printed audit trail to indicate that the printed audit trail is invalid if the voter rejects the voter selections as presented in the printed audit trail; and displaying the ballot having election choices to receive voter reselections.

137. The method of operating a voting machine as recited in claim 133, further comprising detecting a radio frequency identification of the printer to determine whether a valid and/or authorized printer is attached to the voting machine.

138. The method of operating a voting machine as recited in claim 137, further comprising disabling the voting machine unless a valid and/or authorized radio frequency identification detector of the printer is detected.

139. The method of operating a voting machine as recited in claim 133, further comprising positioning the printer behind a display screen.

140. The method of operating a voting machine as recited in claim 139, further comprising selectively making the display screen transparent so that the printed audit trail can be viewed through the display screen.

141. The method of operating a voting machine as recited in claim 140, wherein, when the display screen is made transparent, the voter selection in the display screen remain visible so that the voter can compare the voter selection with the printed audit trail.

142. The method of operating a voting machine as recited in claim 140, further comprising:

aligning the voter selection to correspond to the printing of the voter selection in the printed audit trail;

making the display screen transparent such that the voter selection in the display screen remain visible so that the voter can compare the voter selection with the printed audit trail.

143. The method of operating a voting machine as recited in claim 140, wherein only a portion of the display is made transparent.

144. The method of operating a voting machine as recited as recited in claim 140, further comprising segmentally making the display screen transparent such that at least one portion of the printed audit trail that should be viewed by the voter can be viewed through the display screen.

145. The method of operating a voting machine as recited in claim 133, further comprising including at least one security feature to the print medium to ensure that the printed audit trail is authentic.

146. The method of operating a voting machine, as recited in claim 145, wherein the security feature is the at least one security ink that is printed on the print medium, the security ink including at least one of an infrared, ultraviolet and fluorescent ink.

147. The method of operating a voting machine as recited in claim 145, wherein the security feature includes an invisible portion and a visible portion that is printed on the print medium.

148. The method of operating a voting machine as recited in claim 133, further comprising disposing privacy shields on the voting machine that restrict a visibility of the display screen and the printed audit trail only to the voter.

149. The method of operating a voting machine as recited in claim 133, further comprising attaching privacy shields to the printer.

150. The method of operating a voting machine as recited in claim 133, further comprising detecting a position of the printed audit trail in order to print respective printed audit trails in a randomized order.

151. The method of operating a voting machine as recited in claim 133, further comprising randomizing a print position of the audit trail.

152. The method of operating a voting machine as recited in claim 133, further comprising randomizing a printed position of the audit trail by keeping track of a print medium print position and portions of the print medium.

153. The method of operating a voting machine as recited in claim 133, further comprising:

providing the printer with a tamper resistant container for containing the print medium on which the printed audit trails is printed; and restricting access to the print medium in the tamper resistant container.

154. The method of operating a voting machine as recited in claim 153, wherein restricting access to the print medium includes using at least one security feature that includes at least one of locking mechanisms, tamper evident tape, alarms and electronic identification.

155. The method of operating a voting machine as recited in claim 133, further comprising:

detecting whether at least one of the secured components of the voting machine is unsecured; and disabling the voting machine if the at least one of the secured components of the voting machine is unsecured.

156. The method of operating a voting machine as recited in claim 133, further comprising:

printing the audit trail using an invisible ink; and emitting a light onto the audit trail that causes an invisibly printed audit trail to become visible to the voter.

157. The method of operating a voting machine as recited in claim 133, further comprising attaching a printer to the voting machine in a slotting manner.

158. The method of operating a voting machine as recited in claim 133, further comprising:

linking a locking mechanism the locks a printer to the voting machine with a software interlock; and releasing the printer from the locking mechanism by operation of the software interlock.

159. The method of operating a voting machine as recited in claim 133, further comprising coupling the voting machine to a remote database.

160. The method of operating a voting machine as recited in claim 133, further comprising storing the selection of the voter in a memory of a printer.

161. The method of operating a voting machine as recited in claim 133, further comprising storing the selection of the voter in a removable storage device coupled to the voting machine.

162. The method of operating a voting machine as recited in claim 133, further comprising storing the selection of the voter in a memory within the voting machine.

163. The method of operating a voting machine as recited in claim 133, further comprising recording each transaction undertaken on the voting machine.

164. The method of operating a voting machine as recited in claim 163, further comprising recording each transaction as a code.

165. The method of operating a voting machine as recited in claim 133, further comprising recording a summary of the selection of the voter.

166. The method of operating a voting machine as recited in claim 133, further comprising recording a carbon copy of the selection of the voter.

167. The method of operating a voting machine as recited in claim 133, further comprising recording each action undertaken on the voting machine.

168. The method of operating a voting machine as recited in claim 133, further comprising recording a code that is used to identify the voter.

169. The method of operating a voting machine as recited in claim 133, further comprising powering up and initiating data communication between the voting machine and the printer when the printer is coupled to the voting machine.

170. The method of operating a voting machine as recited in claim 133, further comprising communicating with the printer using at least one of a cable and a cable-less connection.

171. The method of operating a voting machine as recited in claim 133, further comprising communicating with the printer using at least one of a parallel interface, a serial interface, a Universal Serial Bus (USB) interface, a Firewire interface and a Peripheral Connection Interface (PCI) Express.

172. The method of operating a voting machine as recited in claim 133, further comprising:

determining whether the printed audit trail is larger than the printer window; and determining whether an entire printed audit trail is to be printed or the printed audit trail is to be printed sectionally, each section corresponding to at least a portion of the printer window, if the printed audit trail is larger than the printer window.

173. The method of operating a voting machine as recited in claim 172, further comprising displaying the printed audit trail a section at a time for view by the voter.

174. The method of operating a voting machine as recited in claim 173, further comprising recording the printed audit trail when all the sections are accepted by the voter.

175. The method of operating a voting machine as recited in claim 172, further comprising:

printing an entire audit trail; and allowing the voter to scroll back and forth to review the entire printed audit trail.

176. The method of operating a voting machine as recited in claim 175, further comprising recording the entire printed audit trail when the voter accepts the entire printed audit trail.

177. The method of operating a voting machine as recited in claim 133, further comprising:

determining whether the printed audit trail is smaller than the printer window; and reducing a space allocated for printing on the print medium, if the printed audit trail is smaller than the printer window.

178. The method of operating a voting machine as recited in claim 133, further comprising adjusting a printer window size by inserting a mask at the printer window.

179. The method of operating a voting machine as recited in claim 178, further comprising:

sensing the mask; and causing the printer to print corresponding to the visible portion of the printer window.

180. The method of operating a voting machine as recited in claim 133, further comprising adjusting a printer window to accommodate a smaller size of the printed audit trail.

181. The method of operating a voting machine as recited in claim 180, wherein the printer window includes an adjustable liquid crystal type mask, the method further comprising activating the adjustable liquid crystal type mask to create a corresponding transparent portion in which the printed audit trail is visible and to create an opaque remaining portion.

182. The method of operating a voting machine as recited in claim 133, further comprising sensing a print head failure.

183. The method of operating a voting machine as recited in claim 133, further comprising sensing a print medium jam.

184. The method of operating a voting machine as recited in claim 133, further comprising sensing that a portion of the recording medium to be printed is blank prior to printing on the print medium.

185. The method of operating a voting machine as recited in claim 133, further comprising sensing the amount of print medium available for printing.

186. The method of operating a voting machine as recited in claim 133, further comprising interrogating the voting machine to detect whether the voting machine is properly functioning.

187. The method of operating a voting machine as recited in claim 186, further comprising printing an error code on the print medium if the voting machine is not properly functioning.

188. The method of operating a voting machine as recited in claim 133, further comprising interrogating the printer to detect whether the printer is properly functioning.

189. The method of operating a voting machine as recited in claim 188, further comprising displaying an error code on the display if the printer is not properly functioning.

190. The method of operating a voting machine as recited in claim 133, further comprising:

printing the audit trail in a machine-readable format; and converting the machine-readable printed audit trail into audible output.

191. The method of operating a voting machine as recited in claim 133, further comprising configuring the voting machine to accommodate various languages.

192. The method of operating a voting machine as recited in claim 191, further comprising printing an English-language translation of the audit trail printed in a foreign language.

193. The method of operating a voting machine as recited in claim 133, further comprising printing in various fonts.

194. The method of operating a voting machine as recited in claim 133, further comprising providing a printer window with a magnifying effect.

195. The method of operating a voting machine as recited in claim 133, further comprising selectively providing illumination at a printer window.

* * * * *

UNITED STATES PATENT AND TRADEMARK OFFICE

CERTIFICATE OF CORRECTION

PATENT NO. : 7,111,782 B2
APPLICATION NO. : 10/811969
DATED : September 26, 2006
INVENTOR(S) : John Homewood et al.

It is certified that error appears in the above-identified patent and that said Letters Patent is hereby corrected as shown below:

On Title Page

Item
(73) Should read as follows:
Sequoia Voting Systems Inc. Oakland, California

(74) Should read as follows:
Oliff & Berridge PLC

Signed and Sealed this

First Day of May, 2007

JON W. DUDAS
*Director of the United States Patent and Trademark Office*